United States Patent
Miyatake

(10) Patent No.: US 10,947,337 B2
(45) Date of Patent: Mar. 16, 2021

(54) TOUGHENED EPOXY RESIN COMPOSITION

(71) Applicant: KANEKA CORPORATION, Osaka (JP)

(72) Inventor: Nobuo Miyatake, Hyogo (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 16/155,008

(22) Filed: Oct. 9, 2018

(65) Prior Publication Data

US 2019/0040182 A1 Feb. 7, 2019

Related U.S. Application Data

(63) Continuation of application No. PCT/JP2017/015116, filed on Apr. 13, 2017.

(30) Foreign Application Priority Data

Apr. 13, 2016 (JP) .............................. JP2016-080286

(51) Int. Cl.
| | |
|---|---|
| C08G 59/22 | (2006.01) |
| C08L 71/02 | (2006.01) |
| C08L 51/00 | (2006.01) |
| C08L 63/00 | (2006.01) |
| C08G 59/42 | (2006.01) |
| C08G 59/18 | (2006.01) |
| C08G 59/32 | (2006.01) |
| C08G 59/50 | (2006.01) |
| C08G 65/04 | (2006.01) |
| C08L 25/08 | (2006.01) |
| C08L 33/10 | (2006.01) |
| C08L 101/06 | (2006.01) |

(52) U.S. Cl.
CPC ............. *C08G 59/22* (2013.01); *C08G 59/18* (2013.01); *C08G 59/188* (2013.01); *C08G 59/3227* (2013.01); *C08G 59/4253* (2013.01); *C08G 59/502* (2013.01); *C08G 59/5026* (2013.01); *C08G 65/04* (2013.01); *C08L 25/08* (2013.01); *C08L 33/10* (2013.01); *C08L 51/00* (2013.01); *C08L 63/00* (2013.01); *C08L 71/02* (2013.01); *C08L 101/06* (2013.01); *C08G 2650/04* (2013.01); *C08G 2650/58* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 3,208,980 A | 9/1965 | Gruver et al. | |
| 4,497,945 A | 2/1985 | Salloum et al. | |
| 4,904,745 A * | 2/1990 | Inoue ..................... | C08G 65/12 525/404 |
| 7,923,073 B2 | 4/2011 | Verghese et al. | |
| 8,927,677 B2 | 1/2015 | Karunakaran et al. | |
| 2003/0162912 A1* | 8/2003 | Disch ....................... | C08K 5/34 525/539 |
| 2008/0200589 A1* | 8/2008 | Hubschmid ............. | C08L 53/00 523/436 |
| 2009/0149600 A1* | 6/2009 | Ness ........................ | C08L 69/00 525/67 |
| 2014/0378580 A1* | 12/2014 | Amou ....................... | H01B 3/40 523/438 |
| 2015/0274962 A1 | 10/2015 | Gulyas et al. | |
| 2015/0368457 A1* | 12/2015 | Klamo .................... | C08G 59/42 523/200 |
| 2017/0306144 A1* | 10/2017 | Kobayashi .............. | C08L 67/04 |

FOREIGN PATENT DOCUMENTS

JP    H09324110 A    12/1997

OTHER PUBLICATIONS

International Search Report issued in International Application No. PCT/JP2017/015116; dated Jul. 4, 2017 (2 pages).

* cited by examiner

*Primary Examiner* — Megan McCulley
(74) *Attorney, Agent, or Firm* — Osha Bergman Watanabe & Burton LLP

(57) ABSTRACT

A toughened epoxy resin composition includes an end-capped polyalkylene oxide (A), an epoxy resin (B), an epoxy curing agent (C), and a core shell polymer (D). The end-capped polyalkylene oxide (A) has a number average molecular weight of 1500 to 5000, and 40% or more of a total number of ends of the end-capped polyalkylene oxide (A) are capped with at least one selected from the group consisting of an alkyl group, an allyl group, and an aryl group. A weight ratio of the end-capped polyalkylene oxide (A) to the core shell polymer (D) is 10/90 to 90/10. The core shell polymer (D) comprises a core layer in an amount of 70 to 95% by weight and the core layer is one or more selected from the group consisting of diene rubber, (meth)acrylate rubber, organosiloxane rubber, styrene polymer, and (meth)acrylate polymer.

20 Claims, No Drawings

TOUGHENED EPOXY RESIN COMPOSITION

TECHNICAL FIELD

One or more embodiments of the present invention relate to a toughened epoxy resin composition, a method for preparing the toughened epoxy resin composition, and a cured product formed from the toughened epoxy resin composition.

BACKGROUND

In one or more embodiments, an epoxy resin has been used in wide application for long time because a cured product thereof has excellent heat resistance, mechanical properties, and chemical resistance and the like. However, there is a disadvantage that the cured product of the epoxy resin is fragile, so that toughening of the epoxy resin is required in many cases. Therefore, various methods of adding a rubber component to an epoxy resin as a modifier have been investigated and applied as a method of toughening the epoxy resin.

For example, there is a method of adding a reactive liquid rubber such as a butadiene/acrylonitrile liquid rubber (CTBN) having a carboxylic acid at ends thereof, or nitrile rubber (for example, Patent Document 1). In this technique, after the reactive liquid rubber and the nitrile rubber are dissolved in the epoxy resin, a phase separation thereof are caused during curing. On the other hand, the rubber component partially dissolves and remains in the cured epoxy resin phase because the rubber component reacts with the epoxy resin or strongly interacts with the epoxy resin. Therefore, there is a problem that the glass transition temperature (hereinafter also referred to as Tg) of the cured product greatly decreases.

Patent Document 2 discloses that a polyether polyol having a molecular weight of 1000 to 3000 is used as a toughening agent of an epoxy resin. In this method, a cured product of the epoxy resin is toughened, but the reduction of Tg thereof can't be avoided.

Patent Document 3 discloses that a cured product of an epoxy resin is toughened without lowering Tg thereof by using a polyether polyol having a molecular weight of more than 7000. However, in this method, the viscosity of the composition rises and the storage stability deteriorates because the molecular weight of the polyether polyol used is large.

Patent Document 4 and Patent Document 5 disclose that a block type polyether polyol composed of a polyethylene oxide and a polypropylene oxide or a polybutylene oxide is used. However, in any of these techniques, the toughening of the cured product of the epoxy resin is insufficient.

On the other hand, Patent Document 6 discloses that a polyoxyalkylene polyol and a core shell rubber are used in combination. However, in this method, a composition having a low viscosity can be obtained by using the polyoxyalkylene polyol, but the toughness must be sacrificed. In addition, Tg decreases when the use ratio of the polyol increases.

Therefore, there is still a need for a method for lowering the viscosity of the composition and toughening a cured product thereof without lowering Tg of the cured product.

PATENT DOCUMENTS

Patent Document 1: U.S. Pat. No. 3,208,980 description
Patent Document 2: U.S. Pat. No. 4,497,945 description
Patent Document 3: U.S. Pat. No. 8,927,677 description
Patent Document 4: Japanese Patent Application Laid-Open Publication No. JP Hei 9-324110
Patent Document 5: U.S. Pat. No. 7,923,073 description
Patent Document 6: U.S. Patent Application Publication No. 2015/0274962 description

SUMMARY

One or more embodiments of the present invention provide a toughened epoxy resin composition which has a low viscosity, is easy to handle, and becomes a cured product having excellent heat resistance and toughness. One or more embodiments of the present invention provide a toughened epoxy resin composition which becomes a cured product having thermal shock resistance and delamination resistance, and a toughened epoxy resin composition having adhesion.

That is, one or more embodiments of the present invention relate to a toughened epoxy resin composition comprising: an end-capped polyalkylene oxide (A) having a number average molecular weight of 1500 to 5000, an epoxy resin (B), an epoxy curing agent (C), and a core shell polymer (D), wherein 40% or more of ends in total ends of the end-capped polyalkylene oxide (A) are capped with at least one group selected from the group consisting of an alkyl group, an allyl group, and an aryl group, a weight ratio of the end-capped polyalkylene oxide (A) to the core shell polymer (D) is 10/90 to 90/10, the core shell polymer (D) has a core layer selected from the group consisting of diene rubber, (meth) acrylate rubber, organosiloxane rubber, styrene polymer, and (meth)acrylate polymer, a core content of the core shell polymer is 70 to 95% by weight per 100% by weight of the core shell polymer (D).

2) Moreover, in one or more embodiments of the present invention, it is preferable that the end-capped polyalkylene oxide (A) is at least one selected from the group consisting of a polypropylene oxide, a polybutylene oxide, and an oxy-3-methyltetramethylene/oxybutylene copolymer.

3) Moreover, in one or more embodiments of the present invention, it is preferable that the ends of the end-capped polyalkylene oxide (A) are capped with the allyl group and/or the alkyl group.

4) Moreover, in one or more embodiments of the present invention, it is preferable that 70% or more of ends in total ends of the end-capped polyalkylene oxide (A) are capped.

5) Moreover, in one or more embodiments of the present invention, it is preferable that a shell layer of the core shell polymer (D) contains a copolymer comprising 60 to 99% by weight of an alkyl group-containing (meth) acrylate monomer unit, 1 to 40% by weight of an epoxy group-containing vinyl monomer unit, and 0 to 25% by weight of a monomer unit different from the alkyl group-containing (meth) acrylate monomer unit and the epoxy group-containing vinyl monomer unit.

6) Moreover, in one or more embodiments of the present invention, it is preferable that an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

7) Moreover, one or more embodiments of the present invention relate to a method for preparing the toughened epoxy resin composition comprising the step of; mixing a dispersion in which the core shell polymer (D) is dispersed in the epoxy resin (B), the end-capped polyalkylene oxide (A), and the epoxy curing agent (C).

8) Moreover, one or more embodiments of the present invention relate to a method for preparing the toughened epoxy resin composition comprising the step of; mixing a dispersion in which the core shell polymer (D) is dispersed in the end-capped polyalkylene oxide (A), the epoxy resin (B), and the epoxy curing agent (C).

9) Moreover, one or more embodiments of the present invention relate to a cured product formed from the toughened epoxy resin composition.

The toughened epoxy resin composition of one or more embodiments of the present invention has low viscosity, and the cured product obtained from the toughened epoxy resin composition has excellent heat resistance and toughness. Moreover, according to one or more embodiments of the present invention, effects of thermal shock resistance, delamination resistance, and adhesion are also exhibited.

DETAILED DESCRIPTION OF THE EMBODIMENTS

A toughened epoxy resin composition of one or more embodiments of the present invention comprises an end-capped polyalkylene oxide (A), an epoxy resin (B), an epoxy curing agent (C), and a core shell polymer (D).

A polyalkyleneoxypolyol has been used for a long time to lower a viscosity of an epoxy resin composition, and to toughen the epoxy resin composition. In addition, the use of the polyalkyleneoxypolyol in combination with a core shell polymer also has already been examined, but it is still difficult to sufficiently improve the toughness while maintaining a heat resistance of the epoxy resin. Furthermore, it may be difficult to suppress a viscosity increase of a composition, because the viscosity of the composition increases when the core-shell polymer is used.

A surprising feature of one or more embodiments of the present invention is that a combined use of the core shell polymer and the end-capped polyalkylene oxide shows quite unexpectedly more large effects of toughening and synergistic effects than when the core shell polymer and the end-capped polyalkylene oxide are independently used. These effects are not seen in Patent Document 6 using a polyoxyalkylene polyol and a core shell polymer.

Fracture toughness and thermal shock resistance are used as an index of toughness, but these are not always correlated. For example, while the fracture toughness is high, the thermal shock resistance is low in some cases. On the other hand, while the fracture toughness is low, the thermal shock resistance is high in some cases. In contrast, one or more embodiments of the present invention can improve the both physical properties such as fracture toughness and thermal shock resistance at the same time and can also maintain Tg of a cured product of the epoxy resin. Furthermore, the viscosity of the obtained epoxy resin composition is not increased largely, and a toughened epoxy resin composition having excellent balance of physical properties (fracture toughness, thermal shock resistance, delamination resistance, adhesion) is obtained.

Hereinafter, the toughened epoxy resin composition of one or more embodiments of the present invention is explained in detail.

<End-Capped Polyalkylene Oxide (A)>

The end-capped polyalkylene oxide (A) of one or more embodiments of the present invention has a number average molecular weight of 1500 to 5000, and its main chain structure may be a polymer having a structure represented by —R—O— as a repeating unit, wherein R may be a divalent organic group having 1 to 20 of carbon atoms (including at least an alkylene group).

From the viewpoint of improving the fracture toughness, the number average molecular weight of the end-capped polyalkylene oxide (A) is preferably 1600 to 4800, more preferably 1700 to 4600, and even more preferably 1800 to 4400. The number average molecular weight can be measured, for example, by gel permeation chromatography based on polystyrene conversion.

The number of carbon atoms of the divalent organic group is more preferably from 2 to 10, and even preferably from 2 to 6. The divalent organic group includes at least an alkylene group, and the alkylene group may be substituted with a group selected from the group consisting of an aliphatic hydrocarbon group, an aromatic hydrocarbon group, and an alicyclic hydrocarbon group.

The aliphatic hydrocarbon group is preferably a linear alkyl group such as a methyl group, an ethyl group, a propyl group, a butyl group, a pentyl group, a hexyl group, a heptyl group or an octyl group; a branched alkyl group such as an iso-propyl group or a tert-butyl group; an alkenyl group such as a vinyl group, an allyl group, a 1-propenyl group, a 1-butenyl group.

The alicyclic hydrocarbon group is preferably a cycloalkylene group such as a cyclopropyl group, a cyclobutyl group, a cyclopentyl group, a cyclohexyl group, a cycloheptyl group; a cycloalkenyl group such as 1-cyclohexenyl.

The aromatic hydrocarbon group is preferably an aryl group such as a phenyl group or a naphthyl group.

Among them, the divalent organic group is more preferably a linear or branched alkylene group.

Further, the polymer may be a homopolymer in which all of repeating units are the same or a copolymer containing two or more types of repeating units. Further, the polymer may have the branched structure in the main chain, and the branched structure is preferable because the branched structure can lower the viscosity of the composition. Also, the polymer which does not react with the epoxy resin or the epoxy curing agent is preferable because Tg of the cured product can be easily maintained. However, it is preferable that an amount of the —R—O— unit, wherein R has 3 or more of carbon atoms, is 80% by weight or more per total weight. When the amount is smaller than this, the balance between Tg and toughness of the cured product of the epoxy resin tends to be poor.

A concrete example of the alkylene group contained in R includes —$CH_2CH_2$—, —$CH(CH_3)$ $CH_2$—, —$CH_2CH_2CH_2CH_2$—, $CH_2CH(CH_3)CH_2CH_2$—, —$CH_2C(CH_3)_2$ $CH_2$— and the like. R is particularly preferably —$CH(CH_3)CH_2$—, —$CH_2CH_2CH_2CH_2$—, and —$CH_2CH(CH_3)CH_2CH_2$—.

A concrete example of —R—O— includes polypropylene oxide, polypropylene oxide containing a small amount of oxyethylene unit, polybutylene oxide, oxy-3-methyltetramethylene/oxybutylene copolymer containing oxy-3-methyltetramethylene unit and the like. Polypropylene oxide, polybutylene oxide, oxy-3-methyltetramethylene/oxybutylene copolymer containing oxy-3-methyltetramethylene unit is preferred from the viewpoint that the reduction of Tg is low.

40% or more of the ends in total ends of the end-capped polyalkylene oxide (A) are capped with at least one group selected from the group consisting of an alkyl group, an allyl group, and an aryl group.

That is, a polyalkylene oxide usually has a hydroxyl group at ends, but the ends of the end-capped polyalkylene oxide (A) are capped with at least one group selected from the group consisting of an alkyl group, an allyl group, and an aryl group, through an ether bond, a urethane bond, a urea bond, an ester bond, a carbonate bond or the like.

The number of carbon atoms of the alkyl group, the aryl group, and the allyl group is, for example, 1 to 8, preferably 1 to 6, more preferably 2 to 5.

A concrete example of the alkyl group includes —$CH_3$, —$CH_2CH_3$, —$CH_2CH_2CH_3$, —$CH_2CH_2CH_2CH_3$, —$CH_2CH(CH_2CH_3)$ $CH_2CH_2CH_3$ and the like.

A concrete example of the aryl group includes —$C_6H_5$, —$C_6H_4$—$CH_3$ and the like.

A concrete example of the allyl group includes —$CH_2$—$CH=CH_2$, —$CH_2$—$C(CH_3)=CH_2$ and the like.

Among them, the ends of the end-capped polyalkylene oxide (A) are capped with preferably an allyl group and/or an alkyl group, more preferably an allyl group or a butyl group. These end structures may be the same or different. Also, these polyalkylene oxides may be used individually, or two or more of these may be used in combination.

In one or more embodiments of the present invention, 40% or more, preferably at least 50% or more, more preferably 70% or more, even preferably all 80% or more, and particularly preferably 90% or more of the total ends of the end-capped polyalkylene oxide (A) are capped with the organic groups. The upper limit of the ratio of capped ends in all ends is for example 100%, and may be about 99% or 97%. When the ratio of capped ends in all ends increases, fracture toughness, Tg, and thermal shock resistance can be further improved.

In particular, an end-capped polyalkylene oxide which is capped through ether bonds is preferable, because it can lower the viscosity of the composition, the end-capped structure is stably maintained during curing at high temperature so that the Tg of the cured product is easily maintained, and the effect of toughening is high. Further, an end-capped polyalkylene oxide having the branched structure is more preferable, because it can lower the viscosity of the composition.

It is essential that the end-capped polyalkylene oxide (A) is used in combination with a core-shell polymer (D) described below. From the viewpoint of improving the fracture toughness, maintaining the glass transition temperature, and improving the thermal shock resistance while lowering the viscosity of the composition, the weight ratio of the end-capped polyalkylene oxide (A)/core shell polymer (0) is 10/90 to 90/10, preferably 15/85 to 85/15, and more preferably 25/75 to 75/25 from the viewpoint of improving fracture toughness and thermal shock resistance. Outside this range, the effect of combined use of the polyalkylene oxide (A) and the core shell polymer (D) tends to decrease.

In addition, the amount of the end-capped polyalkylene oxide (A) is preferably 0.5 to 20% by weight, more preferably 0.6 to 16% by weight, even preferably 0.7 to 12% by weight, even more preferably 1.0 to 7.0% by weight per 100% by weight of a sum of the end-capped polyalkylene oxide (A), the epoxy resin (B), the epoxy curing agent (C), and the core shell polymer (D). If the amount is too small, the effect of improving toughness is not observed. If the amount is too much, adhesive substances are seen on the surface of the cured product of the epoxy resin, and reversely the toughness may be deteriorated.

<Epoxy Resin (B)>

As the epoxy resin (B) of one or more embodiments of the present invention, any epoxy resin (B) can be used as long as it has two or more epoxy groups in the molecule.

For example, epoxy resins such as glycidyl ether-type epoxy resins such as bisphenol A diglycidyl ether and bisphenol F diglycidyl ether; cycloaliphatic-type epoxy resins such as 3,4-epoxycyclohexylmethyl carboxylate and 1,4-cyclohexanedimethanol diglycidyl ether; linear-aliphatic epoxy resins such as 1,4-butanediol diglycidyl ether, 1,6-hexanediol diglycidyl ether and polypropylene glycol diglycidyl ether; glycidyl ester-type epoxy resins such as hexahydrophthalic acid glycidyl ester; glycidyl amine-type epoxy resin such as tetraglycidyl aminodiphenyl methane, glycidyl compound of xylene diamine, triglycidyl aminophenol, glycidyl aniline; polysiloxane-type epoxy resins having an epoxy group at the end or side chain of polydimethylsiloxane; phenol novolac-type epoxy resins; cresol novolac-type epoxy resins; triphenylglycidyl ether methane, tetraphenylglycidyl ether methane; brominated phenol novolac-type epoxy resins; dicyclopentadienenovolac-type epoxy resins; and naphtholnovolac-type epoxy resins can be used. These epoxy resins may be used individually, or used in combination.

A reactive diluent having one epoxy group in a molecule may be added to the epoxy resin (B). The reactive diluent has effects of reducing the viscosity of the toughened epoxy resin composition. Preferably, the reactive diluent is used in an amount of up to 45 parts by weight per 100 parts by weight of the epoxy resin. When the reactive diluent is used in an excessive amount, the heat resistance of a cured product is lowered.

The reactive diluent having one epoxy group in the molecule includes alkyl monoglycidyl ether such as alkyl glycidyl ether having the carbon atoms of 8 to 14 such as butyl glycidyl ether, 2-ethyl hexyl glycidyl ether and the like, phenol monoglycidyl ether such as phenyl glycidyl ether, nonyl phenyl glycidyl ether and the like. These reactive diluents may be used in the combination of two or more reactive diluents.

The epoxy equivalent of the epoxy resin is, for example, 130 to 4000 g/eq, preferably 150 to 3000 g/eq, more preferably 160 to 1500 g/eq, even preferably 170 to 1000 g/eq.

An amount of the epoxy resin (B) is preferably 10 to 85% by weight, more preferably 15 to 80% by weight, even preferably 20 to 75% by weight per 100% by weight of the toughened epoxy resin composition.

<Epoxy Curing Agent (C)>

As the epoxy curing agent (C) of one or more embodiments of the present invention, conventionally known epoxy curing agents can be widely used. The epoxy curing agent (C) includes, for example, aliphatic amines such as diethylaminopropylamine, hexamethylenediamine, methylpentamethylenediamine, trimethylhexamethylenediamine, guanidine, oleylamine and the like; alicyclic amines such as menthane diamine, isophorone diamine, norbornane diamine, piperidine, N, N'-dimethylpiperazine, N-aminoethylpiperazine, 1,2-diaminocyclohexane, bis (4-amino-3-methylcyclohexyl) methane, bis (4-aminocyclohexyl) methane, polycyclohexylpolyamine, 1,8-diazabicyclo [5,4,0] undecene-7 (DBU) and the like; amines having an ether bond such as 3,9-bis (3-aminopropyl)-2,4,8,10-tetraoxaspiro [5,5] undecane (ATU), morpholine, N-methylmorpholine, polyoxypropylene diamine, polyoxypropylene triamine, polyoxyethylene diamine and the like; hydroxyl group-containing amines such as diethanolamine, triethanolamine; acid anhydrides such as tetrahydrophthalic anhydride, methyltetrahydrophthalic anhydride, methylnadic anhydride, hexahydrophthalic anhydride, dodecylsuccinic anhydride and the like; polyamidoamines such as polyamide obtained by reacting dimer acid with polyamine such as diethylenetriamine or triethylenetetramine, polyamide obtained by polycarboxylic acid other than dimer acid and the like; imidazoles such as 2-ethyl-4-methylimidazole and the like; dicyandiamide; epoxy-modified amine obtained by reacting the amines with an epoxy compound, mannich modified amine obtained by reacting the amines with formalin and phenols, michael addition modified amine, modified amines such as ketimine and the like. Among these, alicyclic amines, amines having an ether bond, acid anhydrides, and imidazoles are preferable. When it is desired to increase toughness, alicyclic amines are more preferable. In the case of suppressing reduction of Tg and improving toughness, acid anhydrides and imidazoles are more preferable. These curing agents may be used singly or in combination of two or more kinds.

In order to accelerate the curing by the epoxy curing agent, a curing accelerator may be used together with the curing agent. Examples of the curing accelerator include tertiary amines such as triethylamine and benzyldimethylamine; imidazoles such as 2-methylimidazole and 2-ethyl-4-methylimidazole; organic phosphorus compounds such as triphenylphosphine, tri-p-tolylphosphine and triphenylphosphite; quaternary phosphonium salts such as tetraphenylphosphonium tetraphenylborate, tetraphenylphosphonium tetra-p-tolylborate, tetraphenylphosphine bromide, tetra-n-butylphosphonium bromide and tetra-n-butylphosphonium-o,o-diethylphosphorodithioate; diazabicycloalkenes such as 1,8-diazabicyclo[5.4.0]undecene-7 and organic acid salts thereof; organic metal compounds such as zinc octylate, tin octylate and aluminum acetylacetone complexes; quaternary ammonium salts such as tetraethylammonium bromide and tetrabutylammonium bromide; boron compounds such as boron trifluoride and triphenyl borate; and metal halogen compounds such as zinc chloride and stannic chloride.

Moreover, the latent curing accelerator represented by microcapsule-type latent accelerators in which the surface of a high melting point imidazole compound, dicyandiamide, or a phosphorus-based or phosphine-based accelerator is coated with a polymer, amine salt-type latent curing accelerators, and high-temperature-dissociative thermally cationic polymerizable latent curing accelerators such as Lewis acid salts and Broensted acid salts can be used. These curing accelerators can be used individually or in mixture of two or more thereof.

An amount of the epoxy curing agent used depends on the chemical properties of the curing agent, the desired properties of the epoxy resin composition and the cured product. In the case of an amine group, an acid anhydride group, or a phenolic hydroxy group, an amount of the epoxy curing agent used is preferably selected so as to be 0.7 to 1.3 per epoxy group equivalent. The curing accelerator is preferably used in an amount of about 0.01 to 10 parts by weight per 100 parts by weight of the epoxy resin.

<Core Shell Polymer (D)>

The core shell polymer (D) is a particulate polymer having at least two layers. The amount of the core layer in the core shell polymer is preferably from 70 to 95% by weight, and more preferably from 80 to 93% by weight in the view of mechanical characteristic. In the case where the amount of the core layer is smaller, the viscosity of the epoxy resin composition tends to increase. In the case where the amount of the core layer is too large, it is difficult to prepare the core shell polymer (it is difficult to collect the core shell polymer from a solution after reaction in the practical form even if the core shell polymer can be synthesized). The amount of the core layer in the core shell polymer can be measured with absorbance ratio in spectrum from infrared spectroscopy.

The arithmetic number average particle diameter of the core shell polymer (D) is preferably 0.01 to 0.6 µm, more preferably 0.03 to 0.5 µm, and even preferably 0.05 to 0.4 µm. In order to obtain the core shell polymer (D) having such an average particle size, an emulsion polymerization method is suitable, but when the average particle size is too large or too small, economically and industrially producing the core shell polymer (D) is difficult. The arithmetic number average particle diameter can be measured using Microtrack UPA 150 (manufactured by Nikkiso Co., Ltd.) and the like.

The core shell polymer (D) preferably has a methyl ethyl ketone (MEK) insoluble matter, an amount of the insoluble matter (MEK insoluble content) is preferably 95% by weight or more, more preferably 97% by weight or more, even preferably 98% by weight or more. In the case where the MEK insoluble content is less than 95% by weight, the viscosity of the epoxy resin composition tends to increase and the handling deteriorates. In the present specification, the method for obtaining the MEK insoluble matter of the core shell polymer (D) is as follows. 2 g of the powder or the film of the core shell polymer is immersed in 100 g of MEK at 23° C. for 24 hours. Thus, obtained MEK insoluble matter is collected to dry and weigh, and a weight ratio (%) to a weight of the core shell polymer used in the measurement is calculated as MEK insoluble content.

The core shell polymer (D) is preferably a polymer including a core layer including a crosslinked polymer and a shell layer including a polymer grafted polymerized on the core layer. That is, the shell polymer is preferably chemically bonded to the core polymer. A monomer used in the formation of the shell layer is graft-polymerized on the core polymer for forming the core layer, so that the shell layer covers on a part or the whole of the surface of the core layer.

The core layer is one or more selected from the group consisting of a diene rubber, a (meth) acrylate rubber, an organosiloxane rubber, a styrene polymer and a (meth) acrylate polymer. Among them, the core layer is preferably a diene rubber. In one or more embodiments of the present invention, (meth) acrylate means acrylate and/or methacrylate.

The core layer is preferably a crosslinked polymer having the rubber property in order to improve toughness of the epoxy resin composition. In order to exhibit the rubber property in the core layer, the core layer has a glass transition temperature (hereinafter, the glass transition temperature is referred to as Tg in some case) of preferably 0° C. or less, more preferably −20° C. or less, and particularly preferably −40° C. or less. Tg can be measured with dynamic viscoelastic measuring method or differential scanning calorimetry.

A polymer capable of forming the core layer having the rubber property includes a natural rubber, a rubber polymer comprising from 50 to 100% by weight of at least one monomer (first monomer) selected from a diene monomer (conjugated diene monomer) and (meth)acrylate monomer and from 0 to 50% by weight of other polymerizable vinyl monomer (second monomer), a siloxane rubber, or combination thereof. The diene rubber polymerized with the diene monomer is preferable in the view of highly improving toughness. The core layer is preferably the (meth) acrylate rubber (also referred to as acrylic rubber) in the case where a balance of toughness, weather resistance, and economy is required. It is preferable that the core layer is the polysiloxane rubber, in the view of improving toughness at low temperature.

A monomer (conjugated diene monomer) for constituting the diene rubber used in the core layer includes 1,3-butadiene, isoprene, 2-chloro-1,3-butadiene, 2-methyl-1,3-butadiene and the like. These may be used individually or in combination of two or more monomers.

From the view of highly improving toughness, a butadiene rubber polymerized with 1,3-butadiene, a butadiene-styrene rubber of a copolymer polymerized with 1,3-butadiene and styrene, or a butadiene-acrylate rubber of a copolymer polymerized with 1,3-butadiene and butylacrylate or 2-ethylhexylacrylate is preferable, a butadiene rubber is more preferable. In addition, a butadiene-styrene rubber is more preferable in the view of improving the transparency of the epoxy resin composition obtained from the adjustment of refractive index and improving the balance between the appearance and the toughness. In addition, butadiene-acrylate rubber is preferable, because the weather resistance is improved by decreasing the content of butadiene having double bonds in the butadiene-acrylate rubber by the introduction of the acrylate when such characteristic is required.

A monomer for constituting the (meth)acrylate rubber (also referred to as acrylic rubber) used in the core layer includes alkyl (meth)acrylates such as methyl(meth)acrylate, ethyl(meth)acrylate, butyl(meth)acrylate, 2-ethylhexyl (meth)acrylate, octyl(meth)acrylate, dodecyl(meth)acrylate, stearyl(meth)acrylate, behenyl(meth)acrylate; aromatic ring containing (meth)acrylates such as phenoxy ethyl(meth)acrylate, benzyl(meth)acrylate; hydroxyalkyl(meth)acrylates such as 2-hydroxyethyl(meth)acrylate, 4-hydroxybutyl (meth)acrylate; glycidyl (meth) acrylates such as glycidyl (meth) acrylate and glycidyl alkyl (meth) acrylate; alkoxyalkyl(meth)acrylates; allylalkyl(meth)acrylates such as allyl (meth)acrylate, and allylalkyl(meth)acrylate; multifunctional (meth)acrylates such as monoethylene glycol di(meth) acrylate, triethylene glycol di(meth)acrylate, tetraethylene glycol di(meth)acrylate and the like. These (meth) acrylate monomers may be used individually or in combination of two or more (meth) acrylate monomers. The monomer is preferably ethyl (meth) acrylate, butyl (meth) acrylate, and 2-ethylhexyl (meth) acrylate.

A vinyl monomer (second monomer) polymerizable with the first monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. The vinyl monomer may be used individually or in combination of two or more vinyl monomers. The monomer is particularly preferably styrene.

An organosiloxane rubber that can constitute the core layer includes, for example, an organosiloxane polymer including an alkyl or aryl disubstituted silyloxy unit such as dimethylsiloxane, diethylsiloxane, methylphenylsiloxane, diphenylsiloxane, dimethylsiloxane-diphenylsiloxane; an organosiloxane polymer including an alkyl or aryl monosubstituted siloxane unit such as an organohydrogensiloxane in which a part of the side chain of an alkyl is substituted with a hydrogen atom. These organosiloxane polymers may be used individually or in combination of two or more polymers. Furthermore, a composite rubber including a (meth) acrylate rubber/organosiloxane rubber in combination with a (meth) acrylate-type rubber and organosiloxane rubber may be used. Among them, dimethylsiloxane rubber, methylphenylsiloxane rubber and dimethylsiloxane/butylacrylate composite rubber are preferable in view of weatherability and mechanical properties, and dimethylsiloxane rubber and dimethylsiloxane/butylacrylate composite rubber are most preferable in the view point that these are readily available and economical.

In an embodiment that the core layer includes the organosiloxane-based rubber, the core layer preferably includes at least 10% by weight or more of the organosiloxane polymer sites per 100° by weight of the entire core layer, in order not to impair the mechanical properties at low temperature.

The monomer constituting the styrene polymer used for forming the core layer includes styrene, α-methylstyrene, monochlorostyrene, dichlorostyrene and the like. Preferably, the monomer is styrene.

The monomer constituting the (meth) acrylate-based polymer used for forming the core layer includes, for example alkyl (meth) acrylates such as methyl (meth) acrylate, ethyl (meth) acrylate, butyl (meth) acrylate, 2-ethylhexyl (meth) acrylate, octyl (meth) acrylate, dodecyl (meth) acrylate, stearyl (meth) acrylate, behenyl (meth) acrylate, and the like; aromatic ring containing (meth) acrylates such as phenoxyethyl (meth) acrylate and benzyl (meth) acrylate; hydroxyalkyl (meth) acrylates such as 2-hydroxyethyl (meth) acrylate and 4-hydroxybutyl (meth) acrylate; glycidyl (meth) acrylates such as glycidyl (meth) acrylate and glycidyl alkyl (meth) acrylate; alkoxyalkyl (meth) acrylates; allyl alkyl (meth) acrylates such as allyl (meth) acrylate and allyl alkyl (meth) acrylate; polyfunctional (meth) acrylates such as monoethylene glycol di (meth) acrylate, triethylene glycol di (meth) acrylate, tetraethylene glycol di (meth) acrylate. These (meth) acrylate monomers may be used individually or in combination of two or more. The monomer constituting the (meth) acrylate polymer is preferably methyl methacrylate, ethyl methacrylate, butyl methacrylate. Therefore, the preferable (meth) acrylate polymer is a hard (meth) acrylate polymer unlike a soft (meth) acrylate polymer such as rubber elasticity (meth) acrylate polymer.

In the core layer, it is preferable that a crosslinked structure is introduced in a polymer component polymerized with the above monomers and the organosiloxane polymer component in the view of retaining the dispersion stability of the core shell polymer (D) in the toughened epoxy resin composition. As methods for introducing the crosslinked structure, conventional methods can be used. A method for introducing the crosslinked structure to the polymer polymerized with the above monomer includes a method for adding a crosslinking monomer, such as a multifunctional monomer and a mercapto group-containing compound and the like, to a monomer for forming a polymer, and polymerizing these. In addition, a method for introducing the crosslinked structure to the organosiloxane polymer includes a method for combining partly a multifunctional alkoxysilane compound at polymerization, a method for introducing a reactive group such as a vinyl reactive group, a mercapto group, a methacryloyl group and the like to the organosiloxane polymer, and adding a polymerizable vinyl monomer or organic peroxide to cause radical reaction, and a method for adding a crosslinking monomer such as a multifunctional monomer and a mercapto group-containing compound to the organosiloxane polymer and polymerizing these.

The multifunctional monomer does not include butadiene, and includes allylalkyl(meth)acrylates such as allyl(meth)

acrylate, allylalkyl(meth)acrylate; allyloxyalkyl(meth)acrylates; multifunctional(meth)acrylates having two or more (meth)acrylic groups such as (poly)ethylene glycol di(meth)acrylate, ethylene glycol, butanediol di(meth)acrylate, ethylene glycol di(meth)acrylate, triethylene glycol di(meth)acrylate, tetraethylene glycol di(meth)acrylate; diallyl phthalate, triallylcyanurate, triallylisocyanurate, divinylbenzene and the like. Allylmethacrylate, triallylisocyanurate, butanediol di(meth)acrylate and divinyl benzene are particularly preferable.

The core layer preferably has a glass transition temperature of more than 0° C., more preferably 20° C. or more, even preferably 50° C. or more, particularly preferably 80° C. or more, and most preferably 120° C. or more in the case where the balance between the toughness and the elastic modulus of the epoxy resin.

A polymer capable of forming the core layer in which Tg is more than 0° C., not lowering or improving the elastic modulus of the epoxy resin includes a polymer composed of 50 to 100% by weight (preferably 65 to 99% by weight) of at least one kind of a monomer having Tg of more than 0° C. in homopolymer and 0 to 50% by weight (preferably 1 to 35% by weight) of at least one kind of a monomer having Tg less than 0° C. in homopolymer.

When Tg of the core layer is more than 0° C., it is preferable that the crosslinked structure is introduced in the core layer. Tg increases by the introduction of the crosslinked structure. The method of introducing the crosslinked structure includes the method mentioned above.

A monomer having Tg more than 0° C. in the homopolymer includes those containing the following one or more monomers, but is not particularly limited. The monomer includes unsubstituted aromatic vinyl compounds such as styrene, 2-vinylnaphthalene; a substituted aromatic vinyl compounds such as α-methyl styrene; an alkyl-substituted aromatic vinyl compounds such as 3-methylstyrene, 4-methylstyrene, 2,4-dimethylstyrene, 2,5-dimethylstyrene, 3,5-dimethylstyrene, 2,4,6-trimethylstyrene; alkoxy-substituted aromatic vinyl compounds such as 4-methoxystyrene, 4-ethoxy styrene; halogenated aromatic vinyl compounds such as 2-chlorostyrene, 3-chlorostyrene; ester-substituted aromatic vinyl compounds such as 4-acetoxystyrene; hydroxyl-substituted aromatic vinyl compounds such as 4-hydroxystyrene; vinyl esters such as vinyl benzoate, vinylcyclohexanoate; halogenated vinyl compounds such as vinylchloro; aromatic monomers such as acenaphthalene, indene; alkyl methacrylates such as methyl methacrylate, ethyl methacrylate, isopropyl methacrylate; aromatic methacrylate such as phenyl methacrylate; methacrylates such as isobornyl methacrylate and trimethylsilyl methacrylate; methacrylic monomers including methacrylic acid derivatives such as methacrylonitrile and the like; acrylic acid esters such as isobornylacrylate, tert-butylacrylate; an acrylic monomer containing acrylic acid derivative such as acrylonitrile. Further, the monomer includes a monomer such as acrylamide, isopropylacrylamide, N-vinylpyrrolidone, isobornyl methacrylate, dicyclopentanylmethacrylate, 2-methyl-2-adamantylmethacrylate, 1-adamantylacrylate and 1-adamantylmethacrylate.

In one or more embodiments of the present invention, the core layer may be composed of monolayer in some cases and may be composed of multilayers. In the case where the core layer is composed of multilayer, the polymer composition of each layers may be different each other.

That is, the core layer may be a core layer including two layers including second layer polymerized with a different polymer composition on the surface of the first core layer, and a core layer including three layers including third layer polymerized with a different polymer composition on the surface of the core layer including two layers. When the second core layer of the core including two layers or the third core layer of the core including three layers is a polymer obtained by polymerizing a multifunctional monomer such as triallylisocyanurate as a main component, there is a merit that a shell polymer described below is easily grafted-polymerized. On the contrary, there is a demerit that the manufacture of the core layer including a multilayer structure becomes complicated.

A core content of the core shell polymer (D) is 70 to 95% by weight, preferably 70 to 94% by weight per 100% by weight of the core shell polymer (D).

The shell layer at the outermost side of the core shell polymer (D), that is, the shell polymer plays a role of controlling the compatibility with the end-capped polyalkylene oxide (A), the epoxy resin (B) and the like, and effectively dispersing the core shell polymer (D).

Such shell polymer is preferably grafted on the core layer. More precisely, it is preferable that a monomer used in the formation of the shell layer is graft-polymerized on the core polymer for forming the core layer, and the shell polymer is substantially and chemically bonded to the core polymer. That is, it is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer.

The shell layer of the core shell polymer (D) preferably includes a copolymer comprising 60 to 99% by weight of an alkyl group-containing (meth) acrylate monomer unit, 1 to 40% by weight of an epoxy group-containing vinyl monomer unit, and 0 to 25% by weight of a monomer unit different from these monomer units, more preferably includes a copolymer comprising 60 to 99% by weight of an alkyl group-containing (meth) acrylate monomer unit, 1 to 15% by weight of an epoxy group-containing vinyl monomer unit, and 0 to 15% by weight of a monomer unit different from these monomer units.

A monomer for forming the shell layer may include a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group in the view of uniformly dispersing the core shell polymer in the epoxy resin.

It is particularly preferable to use an epoxy group-containing vinyl monomer or a hydroxyl group-containing vinyl monomer as a part of the monomer for forming the shell layer. These have a large effect of stabilizing the dispersion of the core shell polymer in the epoxy resin for a long time.

The hydroxyl group-containing vinyl monomer or the epoxy group-containing vinyl monomer is contained in the monomer for forming the shell layer in an amount of preferably 1 to 40% by weight, more preferably 2 to 35% by weight. When the hydroxyl group-containing vinyl monomer or the epoxy group-containing vinyl monomer is too much in the monomer for forming the shell layer, the dispersion of the core shell polymer in the epoxy resin tends to be unstable.

In addition, when a multifunctional monomer having two or more double bonds is used as a monomer for forming the shell layer, the cross-linked structure is introduced in the shell layer. Thus, the interaction between the core shell polymer (D) and the epoxy resin (B) decreases, as a result the viscosity of the epoxy resin composition can be lowered. Therefore, it is sometimes preferable to use the polyfunctional monomer having two or more double bonds. On the other hand, when maximum improvement of elongation is required, it is preferable not to use the polyfunctional monomer having two or more double bonds as the monomer for forming the shell layer, because the elongation of the cured product of the epoxy resin tends to decrease.

When the multifunctional monomer is used, the multifunctional monomer is included in an amount of preferably 0.5 to 10% by weight, and more preferably 1 to 5% by weight per 100% by weight of a monomer for forming the shell layer.

A concrete example of the alkyl group-containing (meth) acrylate monomer includes methyl (meth) acrylate, ethyl (meth) acrylate, butyl (meth) acrylate, 2-methoxyethyl (meth) acrylate, 2-ethylhexyl (meth) acrylate, octyl (meth) acrylate and the like.

A concrete example of the aromatic vinyl monomer includes styrene, α-methyl styrene, p-methyl styrene, divinyl benzene and the like.

A concrete example of the hydroxyl group-containing vinyl monomer includes 2-hydroxyethyl (meth) acrylate, 4-hydroxybutyl (meth) acrylate and the like.

A concrete example of the monomer having an epoxy group includes glycidyl (meth) acrylate, 4-hydroxy butyl (meth)acrylate glycidyl ether, allyl glycidyl ether, and the like. Particularly, glycidyl methacrylate is preferable in the view of the stability and the reactivity.

A concrete example of the multifunctional monomer having two or more double bonds is exemplified by the same monomer as the above-mentioned multifunctional monomer. The multifunctional monomer is preferably allylmethacrylate, and triallylisocyanurate.

The shell layer may include other monomer in addition to the above monomers. The amount of the shell layer in the core shell polymer (D) is preferably from 5 to 30% by weight, more preferably from 7 to 20% by weight, per 100% by weight of the entire core-shell polymer. When the amount of the shell layer is too large, the viscosity of the epoxy resin composition tends to be too high. When the amount of the shell layer is too low, the dispersion of the core shell polymer in the epoxy resin becomes difficult.

An amount of the core shell polymer (D) is preferably 0.1 to 20% by weight, more preferably 0.2 to 18% by weight, even preferably 0.4 to 16% by weight, even more preferably from 0.6 to 14% by weight per 100% by weight of the toughened epoxy resin composition. When the amount of the core shell polymer is within the above range, toughness and thermal shock resistance can be improved.

<Method for Preparing Core Shell Polymer (D)>
(Method for Preparing Core Layer)

In the case where the polymer for forming the core layer as the constituent of the core shell polymer (D) used in one or more embodiments of the present invention is polymerized with at least one monomer (first monomer) selected from the diene monomer (conjugated diene monomer) and (meth) acrylate monomer, the core layer can be prepared according to emulsion polymerization, suspension polymerization, micro-suspension polymerization and the like, and for example methods described in WO2005/028546 can be used.

In the case where the polymer for forming the core layer comprises the organosiloxane polymer, the core layer can be prepared by emulsion polymerization, suspension polymerization, micro-suspension polymerization and the like, and for example methods described in EP1338625 can be used.

(Method of Preparing Shell Layer)

The shell layer can be formed by polymerizing a monomer for forming the shell layer by a known radical polymerization. In the case where the core layer is obtained as an emulsion of a precursor of the core shell polymer (D), it is preferable that the polymerization of the monomer for forming the shell layer is carried out by the emulsion polymerization, and for example the shell layer can be prepared according to methods of WO 2005/028546.

The following dispersants can be mentioned as examples of emulsifiers (dispersants) usable in the emulsion polymerization: various acids including alkyl or aryl sulfonic acid such as dioctylsulfosuccinic acid and dodecylbenzenesulfonic acid, alkyl or aryle ether sulfonic acid, alkyl or arylether sulfuric acid such as dodecylsulfuric acid, alkyl or arylether sulfuric acid, alkyl or aryl substituted phosphoric acid, alkyl or arylether substituted phosphoric acid, N-alkyl or arylsarcosinic acid such as dodecylsarcosinic acid, alkyl or arylcarboxylic acid such as oleic acid and stearic acid, and alkyl or arylether carboxylic acid, and anionic emulsifiers (dispersants) such as alkali metal salts or ammonium salts of these acids; nonionic emulsifiers (dispersants) such as alkyl or aryl-substituted polyethylene glycols; and derivatives of polyacrylic acid, polyvinyl alcohol, alkyl-substituted celluloses, polyvinyl pyrrolidone. Any of these emulsifiers (dispersants) may be used individually, or two or more of these may be used in combination.

The amount of the emulsifier (dispersant) is preferably as small as possible, but the dispersion stability of the core shell polymer (D) in the aqueous latex should be secured. The emulsifier (dispersant) preferably has as high water solubility as possible. An emulsifier (dispersant) having high water solubility can be easily washed out with water, and thus its bad influence on the finally obtained polyol composition can be easily avoided.

Thermal decomposition initiator such as 2,2'-azobisisobutylonitrile, organic peroxide, hydrogen peroxide, potassium persulphate, and ammonium persulfate are well known as initiators of emulsion-polymerization. In one or more embodiments of the present invention, the organic peroxide is particularly preferable.

The organic peroxides preferably include t-butylperoxy isopropyl carbonate, p-menthanehydroperoxide, cumenehydroperoxide, dicumyl peroxide, t-butyl hydroperoxide, di-t-butyl peroxide, di-t-hexyl peroxide, and the like. Among these, organic peroxides having a 10 hr half-life temperature (hereinafter also referred to as $T_{10}$) of 120° C. or more such as di-t-butyl peroxide having $T_{10}$ of 124° C., p-menthanehydroperoxide having $T_{10}$ of 128° C., cumenehydroperoxide having $T_{10}$ of 158° C., and t-butyl hydroperoxide having $T_{10}$ of 167° C. are preferably used, in the view of improving the amount of MEK insoluble matter of the core shell polymer (D).

In addition, redox type initiators such as organic peroxides in combination with reducing agents such as sodium formaldehyde sulfoxylate, glucose as needed, and transition metal salts such as ferrous sulfate as needed, further chelating agents such as disodium ethylenediaminetetraacetate as needed, further phosphorus-containing compounds such as sodium pyrophosphate as needed are preferably used.

In the case of polymerization using a redox type initiator, it is possible to carry out the polymerization even at a low temperature at which the organic peroxide does not substantially thermally decompose and to set the polymerization temperature in a wide range, and therefore such a polymerization is preferable.

The amount of the initiator and the amount of the reducing agent, the transition metal salt, the chelating agent when the redox type initiator is used can be used in known range in the art.

Also, a known chain transfer agent can be used. The chain transfer agent may be those used in the conventional emulsion polymerization, and is not particularly limited.

Concrete examples of the chain transfer agent include t-dodecyl mercaptan, n-octylmercaptan, n-tetradecylmercaptan, n-hexylmercaptan, and the like.

Known conditions of polymerization such as polymerization temperature, pressure, and deoxidation, are applicable to the polymerization.

In one or more embodiments of the present invention, preferably, the end-capped polyalkylene oxide has a number average molecular weight of 1500 to 5000, wherein 40% or more of ends in total ends of the polyalkylene oxide are capped with at least one group selected from the group consisting of an alkyl group, an allyl group, and an aryl group, the core shell polymer has a core layer of 70 to 95% by weight selected from the group consisting of diene rubber, (meth)acrylate rubber, organosiloxane rubber, styrene polymer, and (meth)acrylate polymer, and a shell layer of 5 to 30% by weight including a copolymer of a monomer mixture including at least an alkyl group-containing (meth)acrylate monomer and an epoxy group-containing vinyl monomer.

It is more preferable that the end-capped polyalkylene oxide has a number average molecular weight of 1600 to 4800, wherein 70% or more of ends in total ends of the end-capped polyalkylene oxide are capped with an alkyl group and/or an allyl group, the core shell polymer has a core layer of 70 to 95% by weight selected from the group consisting of diene rubber, (meth)acrylate rubber, organosiloxane rubber, styrene polymer, and (meth)acrylate polymer, and a shell layer of 5 to 30% by weight including a copolymer of a monomer mixture including at least an alkyl group-containing (meth) acrylate monomer and an epoxy group-containing vinyl monomer.

<Other Compounded Component>

In one or more embodiments of the present invention, other compounded component can be used, if necessary. As other compounded component, compounded components used in conventional epoxy resin composition may be used and it is not particularly limited. The other compounded component includes for example, a filler such as silica or calcium carbonate, a dehydrating agent such as calcium oxide, a tracking resistance reducing agent/flame retardant such as aluminum hydroxide, a heat radiation agent such as aluminum oxide, a silane coupling agent, a defoaming agent, anti-settling agents, thixotropic agents, colorants such as pigments and dyes, extender pigments, ultraviolet absorbers, an antioxidant, a stabilizer (a gelling inhibitor), a plasticizer, a leveling agent, an antistatic agent, a flame retardant, lubricant, viscosity reducer, low shrinkage agent, organic filler, thermoplastic resin, desiccant, dispersant and the like. Also, glass fiber, carbon fiber and the like used for fiber reinforced resin may be used. In particular, the silane coupling agent is particularly preferable because it improves the adhesion between the filler, the adhesive base material, glass fiber, carbon fiber and the like and the resin. A concrete example of the silane coupling agent includes 3-glycidyloxypropyltrimethoxysilane, 3-glycidoxypropylmethyldimethoxysilane, 3-aminopropyltrimethoxysilane, and the like. The amount used is preferably from 0.1 to 2% by weight per 100% by weight of the epoxy resin composition. Further, since it is necessary to reduce air bubbles of the epoxy resin composition as much as possible, it is preferable to add an antifoaming agent during compounding. As the antifoaming agent, for example, it may be appropriately selected from antifoaming agents such as silicone type, fluorine type, acrylic type, polyoxyethylene type, polyoxypropylene type and the like. A concrete example of antifoaming agents include BYK-A 500 and BYK-1790 manufactured by BYK Chemie. The amount used is preferably 0.01 to 4% by weight per 100% by weight of the epoxy resin composition. When the epoxy resin composition includes a filler and the like, it is preferable to incorporate an anti-settling agent in order to enhance its storage stability. As the anti-settling agent, additives which increase the thixotropy of the epoxy resin composition, such as fumed silica, fine powder organic bentonite and the like are preferred. The use amount of the anti-settling agent is preferably 0.1 to 10% by weight per 100% by weight of the epoxy resin composition. These anti-settling agents may be used as thixotropy-imparting agents when it is compounded in adhesive. The use amount is preferably the same degree. Examples of the flame retardant include inorganic flame retardants such as aluminum hydroxide and magnesium hydroxide and the like, halogenated flame retardants such as tetrabromobisphenol A and its modified products, tetrabromophthalide and the like, phosphorus flame retardant such as triphenyl phosphate, bisphenol A bis (diphenyl) phosphate, reactive bisphenol A bis (diphenyl) phosphate, silicone flame retardants and the like. The flame retardant is preferably used in an amount of 1 to 200 parts by weight per 100 parts by weight of the epoxy resin (B).

<Method for Preparing Toughened Epoxy Resin Composition>

The toughened epoxy resin composition of one or more embodiments of the present invention is a curable epoxy resin composition having an end-capped polyalkylene oxide (A) having a number average molecular weight of 1500 to 5000, an epoxy resin (B), an epoxy curing agent (C) and a core shell polymer (D).

The toughened epoxy resin composition is prepared by a method including a step of mixing a dispersion in which the core shell polymer (D) is dispersed in the epoxy resin (B), the end-capped polyalkylene oxide (A), and the epoxy curing agent (C).

On the other hand, the toughened epoxy resin composition is prepared by a method including a step of mixing a dispersion in which the core shell polymer (D) is dispersed in the end-capped polyalkylene oxide (A), the epoxy resin (B) and the epoxy curing agent (C).

In the composition, a dispersion in which the core shell polymer (D) is temporarily dispersed in the end-capped polyalkylene oxide (A) or the epoxy resin (B) in a state of primary particles is preferably used because the viscosity of the toughened epoxy resin composition is easily controlled. In particular, it is preferable to use a dispersion in which the core shell polymer (D) is dispersed in the polyalkylene oxide (A) or the epoxy resin (B) from the viewpoint of ease of handling at the time of compounding.

As the method for obtaining the dispersion with the core shell polymer (D) dispersed in the polyalkylene oxide (A) or the epoxy resin (B) in a state of primary particles, various methods can be used, and examples thereof include a method in which the core shell polymer (D) obtained in a state of aqueous latex is brought into contact with the polyalkylene oxide (A) or the epoxy resin (B), and unnecessary components such as water are then removed; and a method in which the core shell polymer (D) is temporarily extracted in an organic solvent, the extract is then mixed with the polyalkylene oxide (A) or the epoxy resin (B), and the organic solvent is removed. The method described in WO 2005/028546 is preferably used. The specific method for producing the dispersion preferably includes, in order, a first step of mixing an aqueous latex (specifically, a reaction mixture after production of a core shell polymer by emulsification polymerization), which contains the core shell polymer (D), with an organic solvent having a solubility of 5% or more and 40% or less in water at 20° C., and then mixing the mixture with an excessive amount of water, aggregating the core shell polymer; a second step of separating and collecting the aggregated core shell polymer (D) from the liquid phase, and then mixing the core shell polymer (D) with an organic solvent again, obtaining an organic solvent solution of the core shell polymer (D); and a third step of mixing the organic solvent solution with the polyalkylene oxide (A) or the epoxy resin (B), and then distilling off the organic solvent.

The polyalkylene oxide (A) or the epoxy resin (B) is preferably liquid at 23° C. in the view of easily carrying out the third step. The term "liquid at 23° C." means that the softening point is 23° C. or lower, i.e. fluidity of the polyalkylene oxide (A) or the epoxy resin (B) exhibits 23° C.

To the composition in which particles of the core shell polymer (D) are dispersed in the polyalkylene oxide (A) or the epoxy resin (B) as primary particles (hereinafter, also referred to as a "primary particle dispersion composition"), which is obtained by passing through the above-mentioned steps, the polyalkylene oxide (A) or the epoxy resin (B) is added while appropriately diluting the primary particle dispersion composition if necessary, further an epoxy curing agent (C) is additionally mixed, and if necessary, the above-mentioned other components are mixed to obtain the toughened epoxy resin composition of one or more embodiments of the present invention in which core shell polymers (D) are dispersed.

On the other hand, the powdered core shell polymer (D) obtained by performing solidification by a method such as salting-out and then drying can be redispersed in the polyalkylene oxide (A) or the epoxy resin (B) using a disperser having a high mechanical shearing force, such as three paint rolls, a roll mill or a kneader. Here, by giving a mechanical shearing force to a mixture of the polyalkylene oxide (A) or the epoxy resin (B) and the core shell polymer (D) at a high temperature, the core shell polymer (D) can be efficiently dispersed in the polyalkylene oxide (A) or the epoxy resin (B). The temperature used in the preparation of the dispersion is preferably 50 to 200° C., more preferably 70 to 170° C., even preferably 80 to 150° C., and particularly preferably 90 to 120° C. When the temperature is lower than 50° C., the core shell polymer (D) may not be sufficiently dispersed, and when the temperature is higher than 200° C., the polyalkylene oxide (A), the epoxy resin (B), and the core shell polymer (D) may be thermally degraded.

The toughened epoxy resin composition of one or more embodiments of the present invention may be prepared by mixing the polyalkylene oxide (A), the epoxy resin (B), the epoxy curing agent (C) and the core shell polymer (D) as two liquid including an main component and the curing component. For example, the toughened epoxy resin composition of one or more embodiments of the present invention may be prepared by mixing the epoxy resin curing agent (C) as a curing agent with a mixed component of a polyalkylene oxide (A), an epoxy resin (B) and a core shell polymer (D) an a main components, or may be prepared by mixing a mixture of a polyalkylene oxide (A) and/or the core shell polymer (D) and the epoxy curing agent (C) as a curing agent component and then mixing it with a main component including an epoxy resin.

<Cured Product>

One or more embodiments of the present invention include a cured product formed from the toughened epoxy resin composition. When the specific polyalkylene oxide (A) is used in combination with the core shell polymer, the obtained cured product is excellent in heat resistance and toughness.

<Use>

The toughened epoxy resin composition of one or more embodiments of the present invention is suitable for various applications such as adhesives, paints, composite materials and the like, because it can become to a cured product excellent in heat resistance and toughness.

The present application claims the benefit of priority to Japanese Patent Application Number 2016-080286 filed on Apr. 13, 2016. The entire contents of the specification of Japanese Patent Application Number 2016-080286 filed on Apr. 13, 2016 are hereby incorporated by reference.

Examples

Hereinafter, one or more embodiments of the present invention will be described in detail with reference to Examples and Comparative Examples, but the present invention is not limited thereto, and the variation and the modification of the present invention without departing the gist described above and below are all included the technical scope of the present invention. In the following examples, "part (s)" and "%" mean "part (s) by weight" and "% by weight", respectively.

The measurement and test employed in the following Production Examples, Examples, and Comparative Examples are carried out as follows.

[1] Measurement of Arithmetic Number Average Particle Diameter of Core Shell Polymer An arithmetic number average particle diameters (Mn) of the core shell polymer particles dispersed in the aqueous latex were measured using a particle size analyzer (MICROTRAC (registered trademark) UPA 150, manufactured by Nikkiso Co., Ltd.). A measuring sample was used after diluting with deionized water.

[2] Measurement of MEK Insoluble Content of Core Shell Polymer 2 g of the powder of the core shell polymer obtained by drying a latex was immersed in 100 g of methylethylketone (MEK) at 23° C. for 24 hours, thereafter MEK insoluble matter was separated by a centrifuge. MEK insoluble matter was dried and weighed to calculate a weight ratio (%) of MEK insoluble matter to the weight of the core shell polymer.

[3] Evaluation of Viscosity of Composition (Toughened Epoxy Resin Composition)

Approximately 2 g of the composition was allowed to fall freely along a inner wall of a tube having a diameter of 4.5 mm, and the viscosity was evaluated by the time (sec) when the composition moved by 50 mm. When the viscosity is higher, the measurement time becomes longer. The viscosity of the composition containing the filler was measured at a shear rate of 10 cycles/sec at 25° C. by using a CVO rheometer manufactured by BOHLIN INSTRUMENTS Co., Ltd with a cone plate 4°/20 mm.

[4] Evaluation of Fracture Toughness

The cured epoxy resin product formed from the toughened epoxy resin composition was evaluated for toughness in accordance with ASTM 5045. A specimen of 60 mm (length)×12 mm (width)×5 mm (thickness) was cut out from the molded body, a pre-crack was put in the specimen, and a three-point bending test was conducted at 23° C. to measure the fracture toughness value (release rate of fracture strain energy) Glc(J/m$^2$) was obtained.

[5] Measurement of Glass Transition Temperature (Tg) of Cured Product

The cured product obtained in Evaluation of Toughness or Evaluation of Thermal Shock Resistance was cut by a diamond-cutter. By using the cured product having a weight of 20 mg, the glass transition temperature was measured under a nitrogen flow using a differential scanning calorimeter DSC 220C manufactured by Seiko Instruments Inc. As the measurement method, the temperature was elevated from 50° C. to 220° C. at a temperature elevation rate of 20° C. per minute, and then immediately lowered to 50° C. at a rate of 40° C. per minute to eliminate a thermal history. Thereafter, the temperature was elevated from 50° C. to 220° C. at a temperature elevation rate of 20° C. per minute to measure the glass transition temperature.

[6] Evaluation of Thermal Shock Resistance

Evaluation of Epoxy Resin Composition not Containing Filler: The epoxy resin composition was cast into a mold which was set so that a spring washer (size M 10) made of stainless steel was embedded in the center, and was cured by heating (curing conditions are shown in the text of the examples). The obtained cured product having a diameter of 30 mm and a height of 7 mm was subjected to a heat cycle test with one cycle including holding the cured product at 170° C. for 10 minutes and then at 0° C. for 5 minutes. The number of cycles in which cracks were generated in the cured product was recorded. A larger value shows higher thermal shock resistance.

Evaluation of Filler-Containing Epoxy Resin Composition: The filler-containing epoxy resin composition was cast into a mold which was set so that a hexagonal nut (size M 10) made of stainless steel was embedded in the center, and was cured by heating (curing conditions are shown in the text of the examples). The obtained cured product having a diameter of 30 mm and a height of 10 mm was subjected to a heat cycle test with one cycle including holding the cured product at 150° C. for 30 minutes and then at −40° C. for 30 minutes. The number of cycles in which cracks were generated in the cured product was recorded. A larger value shows higher thermal shock resistance.

[7] Evaluation of Delamination

A test piece of 100 mm (length)×10 mm (width)×2.8 mm (thickness) was cut out from the fiber reinforced composite and was subjected to a three point bending test with a distance between fulcrums of 80 mm and a test speed of 2 mm/min at 23° C. The width of whitened part generated by bending was measured and it was defined as a delamination width.

[8] Content of Glass Fiber

The content of a glass fiber in the fiber reinforced composite was measured by a combustion method in accordance with ASTM D 2584.

[9] Shear Adhesion Strength

According to JIS K 6850, a composition (toughened epoxy resin composition) was applied between two aluminum plates (A2024-T3) of dimensions: 25×100×1.6 mm, the aluminum plates were bonded to each other so that the adhesive thickness was 250 μm. It was cured at room temperature for 20 hours and then at 80° C. for 3 hours. Thereafter, the test piece was subjected to a tensile shear adhesion test at 23° C. under the test speed of 1 mm/min.

An end-capped polyalkylene oxide (A), an epoxy resin (B), an epoxy curing agent (C), and a core shell polymer (D) used in Examples and Comparative Examples are shown below. A dispersion (E) was prepared by dispersing the core shell polymer (D) in the end-capped polyalkylene oxide (A) or the epoxy resin (B).

<Polyalkylene Oxide (A)>

The detail of A-1 to A-5 is referred to Production Examples below.

A-1: PTA 3000, An allyl group-terminated polypropylene oxide in which an end of a polyoxypropylene triol having a number average molecular weight of 3000 described in Production Example 1 below was capped with an allyl group: The ratio of capped ends is 90% or more.

A-2: PTA 4000, An allyl group-terminated polypropylene oxide in which an end of a polyoxypropylene triol having a number average molecular weight of 4000 described in Production Example 2 below was capped with an allyl group: The ratio of capped ends is 90% or more.

A-3: PDA 3000, An allyl group-terminated polypropylene oxide in which an end of a polyoxypropylene diol having a number average molecular weight of 3000 described in Production Example 3 below was capped with an allyl group: The ratio of capped ends is 90% or more.

A-4: PDA 3000-50, An allyl group-terminated polypropylene oxide in which an end of a polyoxypropylene diol having a number average molecular weight of 3000 described in Production Example 4 below was capped with an allyl group: The ratio of capped ends is about 50%.

A-5: PDA 3000-35, An allyl group-terminated polypropylene oxide in which an end of a polyoxypropylene diol having a number average molecular weight of 3000 described in Production Example 5 below was capped with an allyl group: The ratio of capped ends is about 35%.

A-6: PPG 3000, A polyoxypropylene diol having a number average molecular weight of 3000 (Actcol D-3000 manufactured by Mitsui Chemicals, Inc: The ratio of capped ends is about 0%).

A-7: PPT 3000, A polyoxypropylene triol having a number average molecular weight of 3000 (Actcol T-3000 manufactured by Mitsui Chemicals, Inc: The ratio of capped ends is about 0%).

A-8: PMB 3000, A polyoxypropylene glycol monobutyl ether having a number average molecular weight of 3000 (Newpole LB-3000 manufactured by Sanyo Chemical Industries, Ltd: The ratio of capped ends is about 50%).

A-9: PMB 1870, A polyoxypropylene glycol monobutyl ether having a number average molecular weight of 1870 (Newpole LB-625, manufactured by Sanyo Chemical Industries, Ltd: The ratio of capped ends is about 50%).

A-10: PMB 1200, A polyoxypropylene glycol monobutyl ether having a number average molecular weight of 1200 (Newpole LB-285, manufactured by Sanyo Chemical Industries, Ltd: The ratio of capped ends is about 50%).

A-11: PPG 2000, A polyoxypropylene diol having a number average molecular weight of 2000 (Actcol D-2000, manufactured by Mitsui Chemicals, Inc: The ratio of capped ends is about 0%).

A-12: PGEB 2000, A block copolymer of polyoxypropylene and polyoxyethylene having a number average molecular weight of 2000 (Newpole PE-61, manufactured by Sanyo Chemical Industries, Ltd: The ratio of capped ends is about 0%).

<Epoxy Resin (B)>
B-1: BPADGE, bisphenol A diglycidyl ether (jER 828 EL, manufactured by Mitsubishi Chemical Inc, epoxy equivalent: 190 g/eq)
<Epoxy Curing Agent (C)>
C-1: MTHPA-1% 2E4MZ obtained by adding a 1% 2-ethyl-4-methylimidazole (CUREZOL 2E4MZ manufactured by Shikoku Chemicals Inc) cure accelerator to a, methyl tetrahydrophthalic anhydride (HN2200 manufactured by Hitachi Chemical Inc.).
C-2: IPD-D 230, which was obtained by evenly mixing an isophoronediamine (VESTAMIN IPD manufactured by Evonik Inc) and a polypropylene glycol diamine (JEFFAMINE D230 manufactured by Huntsman Inc).
C-3: V-140, a polyamide (VERSAMID 140 manufactured by BASF Inc)
<Core Shell Polymer (D)>
The detail of D-1 to D-3 is referred to Production Examples below.
D-1 to D-3: A core shell polymer in which the main component of the core is a butadiene rubber.
<Dispersion (E) in which Core Shell Polymer (D) was Dispersed in Epoxy Resin (B)>
The detail is referred to Preparation Examples (E-1) to (E-3) below.
<Filler (F)>
F-1: CMC-12S, A crystalline silica (manufactured by Tatsumori Inc, Crystallite CMC-12S, median diameter D50: 6 μm)
<Defoaming Agent (G)>
G-1: BYK-1790, A defoaming agent (manufactured by BYK Inc)
<Liquid Toughner (H)>
H-1: CTBN-Adduct, A butadiene acrylonitrile rubber (CTBN) added bisphenol A diglycidyl ether, CTBN content was 40% by weight (HyPox RA1340 manufactured by CVC Inc).
H-2: DY 965, A polyol reactive toughner (DY965 manufactured by Huntsman Inc)
<Thixotropic Agent (I)>
I-1: TS-720, A fumed silica (CAB-O-SIL TS-720, manufactured by Cabot Inc)
<Silane Coupling Agent (J)>
J-1: Z-6040, A 3-glycidyloxypropyltrimethoxysilane (Z-6040, manufactured by Dow Corning Toray Inc)
1. Preparation of End-Capped Polyalkylene Oxide Production Example 1-1: Allyl Group-Terminated Polypropylene Oxide, PTA 3000

100 parts (0.033 equivalent) of polyoxypropylene triol (Actcol T-3000 manufactured by Mitsui Chemicals Inc) having a number average molecular weight of 3000 was charged in a pressure-resistant reactor, the atmosphere was set to a nitrogen atmosphere. Subsequently, 3.3 time-equivalents of a sodium methoxide (NaOMe) to the hydroxyl group of polyoxypropylene triol was added with methanol solution. The methanol was distilled off under reduced pressure while stirring. Thereafter the atmosphere was returned to the nitrogen atmosphere, then 10.2 parts (0.133 equivalents) of an allyl chloride was dropped and the mixture was stirred for 4 hours to complete the allylation.
300 parts of n-hexane and 300 parts of water were mixed and stirred with respect to 100 parts of the obtained unpurified polypropylene oxide having allyl groups at both ends, the water was removed by centrifugation.

Further, 300 parts of water was added to the obtained hexane solution, the mixture was stirred, the water was again removed by centrifugation, then the hexane was removed by vacuum degassing under reduced pressure. Thus, a branched polypropylene oxide: PTA 3000 having a number average molecular weight of about 3000 in which about 90% of the polymer ends were capped with the allyl group was obtained.

Production Example 1-2: Allyl Group-Terminated Polypropylene Oxide, PTA 4000

A branched polypropylene oxide: PTA 4000 having a number average molecular weight of about 4000 in which about 90% of the polymer ends were capped with the allyl group was obtained in the same manner as Production Example 1-1 except that 100 parts (0.025 equivalents) of polyoxypropylene triol having a number average molecular weight of 4000 (Actcol T-4000 manufactured by Mitsui Chemicals Inc) was used instead of the polyoxypropylene triol having a number average molecular weight of 3000, and that 6.1 parts (0.08 equivalents) of allyl chloride was used.

Production Example 1-3: Allyl Group-Terminated Polypropylene Oxide, PDA 3000

A linear polypropylene oxide: PDA 3000 having a number average molecular weight of about 3000 in which about 90% of the polymer ends were capped with the allyl group was obtained in the same manner as Production Example 1-1 except that 100 parts (0.033 equivalents) of polyoxypropylene diol having a number average molecular weight of 3000 (Actcol D-3000 manufactured by Mitsui Chemicals Inc) was used instead of the polyoxypropylene triol having a number average molecular weight of 3000, and that 6.7 parts (0.875 equivalents) of allyl chloride was used.

Production Example 1-4: Allyl Group-Terminated Polypropylene Oxide, PDA 3000-50

A linear polypropylene oxide: PDA 3000-50 having a number average molecular weight of about 3000 in which about 50% of the polymer ends were capped with the allyl group was obtained in the same manner as Production Example 1-3 except that 4.0 parts (0.525 equivalents) of allyl chloride was used.

Production Example 1-5: Allyl Group-Terminated Polypropylene Oxide, PDA 3000-35

A linear polypropylene oxide: PDA 3000-35 having a number average molecular weight of about 3000 in which about 35% of the polymer ends were capped with the allyl group was obtained in the same manner as Production Example 1-3 except that 2.6 parts (0.205 equivalents) of allyl chloride was used.

Production Example 2: Preparation of Core Shell Polymer 2-1. Formation of Core Layer Production Example 2-1-1; Preparation of Polybutadiene Rubber Latex (R-1)

A pressure resistant polymerization reactor was charged with 200 parts of deionized water, 0.03 parts of tripotassium phosphate, 0.25 parts of potassium dihydrogen phosphate, 0.002 parts of disodium ethylenediaminetetraacetate (EDTA), 0.001 parts of ferrous sulfate heptahydrate (Fe), and 0.2 parts of sodium dodecylbenzenesulfonate (SDS), and the mixture was stirred while sufficiently purging with nitrogen to remove oxygen. Thereafter, 100 parts of butadiene (BD) was introduced into the system, and the temperature was raised to 45° C. 0.015 parts of p-menthanehydroperoxide (PHP) was added and then 0.04 parts of sodium formaldehyde sulfoxylate (SFS) was added to the polymerization reactor, thereby initiating polymerization. At four hours after the polymerization initiation, 0.3 parts of SDS, 0.01 parts of PHP, 0.0015 parts of EDTA, and 0.001 parts of ferrous sulfate heptahydrate (Fe) were introduced thereto. After seven hours of polymerization, 0.4 parts of SDS was added. After ten hours of polymerization, residual monomers were removed by devolatilization under reduced pressure to terminate the polymerization. Thus, a latex (R-1) that contains polybutadiene rubber particles was obtained. The polymerized ratio was 99% or more. The polybutadiene rubber particles contained in the obtained latex had an arithmetic number average particle diameter of 0.14 µm.

2-2. Preparation of Core Shell Polymer (D) (Formation of Shell Layer)

Production Example 2-2-1; Preparation of Latex (D-1LX) Containing Core Shell Polymer (D-1)

Into a glass reactor having five necks equipped with a reflux condenser, a nitrogen inlet, an apparatus for adding monomers and an emulsifying agent, and a thermometer were charged with 1575 parts (corresponding to 518 parts of polybutadiene rubber particles) of the latex (R-1) obtained in Production Example 2-1-1 and 315 parts of deionized water, and the mixture was stirred at 60° C. while purging with nitrogen. After 0.024 parts of EDTA, 0.006 parts of ferrous sulfate heptahydrate (Fe), and 1.2 parts of sodium formaldehydesulfoxylate (SFS) were added, a mixture of graft monomers (7 parts of styrene (ST), 7 parts of glycidyl methacrylate (GMA), 107 parts of MMA and 0.4 parts of cumenehydroperoxide (CHP) was continuously added thereto over a period of 2 hours to carry out graft polymerization. After completion of the addition, the mixture was stirred for further 2 hours to finish the reaction, thereby obtaining a latex (D-1LX) of a core shell polymer (D-1). The polymerized ratio was 99% or more. The core content of the core shell polymer (D-1) was 81% from the charge amount and the reacted rate. An arithmetic number average particle diameter of the core shell polymer (D-1) contained in the obtained latex was 0.15 µm and MEK insoluble content was 98%.

Production Example 2-2-2; Preparation of Latex (D-2LX) of Core Shell Polymer (D-2)

The latex (D-2LX) of the core shell polymer (D-2) was prepared in the same manner as Production Example 2-2-1 except that ST 2 parts, glycidyl methacrylate (GMA) 2 parts, MMA 35 parts, CHP 0.1 parts were used in place of ST 7 parts, GMA 7 parts, MMA 107 parts, CHP 0.4 parts as graft monomers. The polymerized ratio was 99% or more. The core content of the core shell polymer (D-2) was 93% from the charge amount and the reacted rate. An arithmetic number average particle diameter of the core shell polymer (D-2) contained in the obtained latex was 0.14 µm and MEK insoluble content was 98%.

Production Example 2-2-3; Preparation of Latex (D-3) of Core Shell Polymer (D-3LX)

The latex (D-3LX) of the core shell polymer (D-3) was prepared in the same manner as Production Example 2-2-1 except that ST 12 parts, glycidyl methacrylate (GMA) 12 parts, MMA 198 parts, CHP 0.7 parts were used in place of ST 7 parts, GMA 7 parts, MMA 107 parts, CHP 0.4 parts as graft monomers. The polymerized ratio was 99% or more. The core content of the core shell polymer (D-3) was 93% from the charge amount and the reacted rate. An arithmetic number average particle diameter of the core shell polymer (D-3) contained in the obtained latex was 0.16 µm and MEK insoluble content was 98%.

The obtained latex was poured into a large amount of methanol, the obtained precipitate was separated by filtration, and was dried under reduced pressure at room temperature to obtain a core-shell polymer powder (D-3P).

2-3. Preparation of Dispersion (E-1 to E-3) of Core Shell Polymer (D-1 to D-3) Dispersed in Epoxy Resin (B-1)

Production Example 2-3-1; Preparation of Dispersion (E-1) based on epoxy resin (B-1)

100 parts of methyl ethyl ketone (MEK) was introduced into a 1 L mixing tank at 25° C., and the aqueous latex (D-1LX) (corresponding to 30 parts of core shell polymer) of the core shell polymer obtained in Production Example 2-2-1 was charged with stirring. After uniformly mixing, 150 parts of water was charged at a feed rate of 60 parts/minute. After completion of the supply, stirring was stopped immediately to obtain floatable aggregates and a slurry liquid containing aqueous phase containing a portion of organic solvent. Then, the aqueous phase was discharged from the discharging port of the tank bottom. 70 parts of MEK was added to the resulting agglomerates, and uniformly mixed to obtain a dispersion in which a core shell polymer was uniformly dispersed. This dispersion was mixed with 70 parts of an epoxy resin (B-1). MEK was removed from this mixture with a rotary evaporator. Thus, dispersion (E-1) in which core shell polymers (D-1) were dispersed in an amount of 30% by weight in the epoxy resin (B-1) was obtained.

Production Example 2-3-2; Preparation of Dispersion (E-2) Based on Epoxy Resin (B-1)

Dispersion (E-2) in which core shell polymers (D-2) were dispersed in an amount of 30% by weight in the epoxy resin (B-1) was obtained in the same manner as Production Example 2-3-1 except that the aqueous latex (D-2LX) of the core shell polymer was used in place of the aqueous latex (D-1LX) of the core shell polymer used in the production example 2-3-1.

Production Example 2-3-3; Preparation of Dispersion (E-3) Based on Epoxy Resin (B-1)

Dispersion (E-3) in which core shell polymers (D-3) were dispersed in an amount of 30% by weight in the epoxy resin (B-1) was obtained in the same manner as Production Example 2-3-1 except that the aqueous latex (D-3LX) of the core shell polymer was used in place of the aqueous latex (D-1LX) of the core shell polymer used in the production example 2-3-1.

Examples 1 to 8, Comparative Examples 1 to 9

Each of the components was weighed according to a formulation shown in Table 1, and these components were homogeneously mixed by using stirring equipment (planetary centrifugal mixer, AwatoriRentaro, manufactured by Thinky). The mixture was defoamed under reduced pressure to obtain a toughened epoxy resin composition. The obtained composition was cured at 100° C. for one hour, and at 150° C. for three hours to prepare a cured product. The fracture toughness, a glass transition temperature, and the thermal shock resistance were evaluated by using the cured product obtained. Results including the viscosity of the toughened epoxy resin composition are shown in Table 1.

TABLE 1

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|---|---|---|---|---|---|---|
| Compounded amount (parts by weight) | (A) End-capped polyalkylene oxide | A-1 PTA3000 (Allyl group, Ratio of capped ends: 90% or more) | 0.8 | 2.0 | 4.0 | 6.0 | 7.2 | | | | | | | | 8.0 | | | | |
| | | A-2 PTA4000 (Allyl group, Ratio of capped ends: 90% or more) | | | | | | 2.0 | | | | | | | | | | | |
| | | A-3 PDA3000 (Allyl group, Ratio of capped ends: 90% or more) | | | | | | | 7.2 | | | | | | | | | | 8.0 |
| | | A-4 PDA3000-50 (Allyl group, Ratio of capped ends: 50%) | | | | | | | | 7.2 | | | | | | | | | |
| | | A-5 PDA3000-35 (Allyl group, Ratio of capped ends: 35%) | | | | | | | | | 7.2 | | | | | | | | |
| | | A-6 PPG3000 (Ratio of capped ends: 0%) | | | | | | | | | | 7.2 | | | | | | | |
| | | A-7 PPT3000 (Ratio of capped ends: 0%) | | | | | | | | | | | | | | | 4.0 | 8.0 | | |
| | (B) Epoxy resin | B-1 BPADGE | 34.7 | 37.5 | 42.2 | 46.8 | 49.6 | 37.5 | 49.6 | 49.8 | 49.6 | 49.6 | 56.0 | 32.8 | 51.5 | 42.2 | 51.5 | 51.5 | 51.5 |
| | (C) Epoxy curing agent | C-1 MTHPA-1% 2E4MZ | 40.5 | 40.5 | 40.5 | 40.5 | 40.5 | 40.5 | 40.5 | 40.5 | 40.5 | 40.5 | 44.0 | 40.5 | 40.5 | 40.5 | 40.5 | 40.5 | 40.5 |
| | (E) Dispersion in which (D) is dispersed in (B) | E-1 (D-1) 30% by weight (B-1) 70% by weight | 24.0 | 20.0 | 13.3 | 6.7 | 2.7 | 20.0 | 2.7 | 2.7 | 2.7 | 2.7 | | 26.7 | | 13.3 | | | |
| | (Total amount) | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Composition ratio | (A) End-capped polyalkylene | A-1 PTA3000 (Allyl group, | 0.8 | 2.0 | 4.0 | 6.0 | 7.2 | | | | | | | | 8.0 | | | | |

TABLE 1-continued

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|---|---|---|---|---|---|---|
| (% by weight) oxide | | | | | | | | | | | | | | | | | | | |
| | A-2 | PTA4000 Ratio of capped end: 90% or more | | | | | 2.0 | | | | | | | | | | | | |
| | A-3 | PDA3000 (Allyl group, Ratio of capped ends: 90% or more) | | | | | | | 7.2 | | | | | | | | | | |
| | A-4 | PDA3000-50 (Allyl group, Ratio of capped ends: 50%) | | | | | | | | 7.2 | | | | | | | | | 8.0 |
| | A-5 | PDA3000-35 (Allyl group, Ratio of capped ends: 35%) | 7.2 | | | | | | | | 7.2 | | | | | | | | |
| | A-6 | PPG3000 (Allyl group, Ratio of capped ends: 0%) | | | | | | | | | | 7.2 | | | | | | 8.0 | |
| | A-7 | PPT3000 (Ratio of capped ends: 0%) | | | | | | | | | | | | | | | 8.0 | | |
| (B) Epoxy resin | B | BPADGE | 51.5 | 51.5 | 51.5 | 51.5 | 51.5 | 51.5 | 51.5 | 51.5 | 51.5 | 51.5 | 56.0 | 51.5 | 51.5 | 51.5 | 51.5 | 51.5 | 51.5 |
| (C) Epoxy curing agent | C-1 | MTHPA-1% 2E4MZ | 40.5 | 40.5 | 40.5 | 40.5 | 40.5 | 40.5 | 40.5 | 40.5 | 40.5 | 40.5 | 44.0 | 40.5 | 40.5 | 40.5 | 40.5 | 40.5 | 40.5 |
| (D) Core shell polymer | D-1 | Core shell polymer | 7.2 | 6.0 | 4.0 | 2.0 | 0.8 | 6.0 | 0.8 | 0.8 | 0.8 | 0.8 | | 8.0 | | 4.0 | | | |
| Component ratio | | (Total amount) | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| | | Total amount of (A) and (D) part by weight | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| | | Weight ratio of (A)/(D) | 10/90 | 25/75 | 50/50 | 75/25 | 90/10 | 25/75 | 90/10 | 90/10 | 90/10 | 90/10 | — | 0/100 | 100/0 | 50/50 | 100/0 | 100/0 | 100/0 |
| Evaluation | | Viscosity at 21° C. of composition (sec) | 35 | 33 | 32 | 29 | 27 | 34 | 28 | 29 | 30 | 30 | 34 | 59 | 24 | 33 | 24 | 28 | 26 |
| | | Fracture toughness Glc (J/m²) | 750 | 790 | 780 | 760 | 740 | 780 | 730 | 720 | 700 | 600 | 80 | 720 | 600 | 630 | 550 | 580 | 590 |
| | | Glass transition temperature (° C.) | 150 | 151 | 150 | 150 | 150 | 151 | 150 | 147 | 143 | 141 | 151 | 150 | 150 | 143 | 136 | 141 | 150 |
| | | Thermal shock resistance (cycle) | 4 | 5 | 5 | 5 | 4 | 5 | 5 | 4 | 2 | 2 | 0 | 3 | 3 | 2 | 1 | 1 | 3 |

From the results of Table 1, the toughened epoxy resin composition of one or more embodiments of the present invention had low viscosity without increasing viscosity, and the cured product obtained from the toughened epoxy resin composition of one or more embodiments of the present invention had heat resistance and toughness.

Examples 9 to 13, Comparative Examples 10 to 13

Each of the components was weighed according to a formulation shown in Table 2, and these components were homogeneously mixed by using stirring equipment (planetary centrifugal mixer, AwatoriRentaro, manufactured by Thinky). The mixture was defoamed under reduced pressure to obtain a toughened epoxy resin composition. The obtained composition was cured at 23° C. for 20 hours, and at 130° C. for 2 hours to prepare a cured product. The fracture toughness and a glass transition temperature were evaluated by using the cured product obtained. Results including the viscosity of the toughened epoxy resin composition are shown in Table 2.

TABLE 2

| | | | | | Example 9 | Example 10 | Example 11 | Example 12 | Example 13 | Comparative Example 10 | Comparative Example 11 | Comparative Example 12 | Comparative Example 13 |
|---|---|---|---|---|---|---|---|---|---|---|---|---|---|
| Compounded amount (parts by weight) | (A) | End-capped polyalkylene oxide | A-1 | PTA3000 (Allyl group, Ratio of capped ends: 90% or more) | 5.0 | | | | | | | | |
| | | | A-8 | PMB3000 (Butyl group, Ratio of capped ends: 50%) | | 5.0 | | | | | | | |
| | | | A-9 | PMB1870 (Butyl group, Ratio of capped ends: 50%) | | | 5.0 | 5.0 | 5.0 | | | | |
| | | | A-10 | PMB1200 (Butyl group, Ratio of capped ends: 50%) | | | | | | 5.0 | | | |
| | | | A-11 | PPG2000 (Ratio of capped ends: 0%) | | | | | | | 5.0 | | |
| | | | A-12 | PGEB2000 (Ratio of capped ends: 0%) | | | | | | | | 5.0 | |
| | (B) | Epoxy resin | B-1 | BPADGE | 68.8 | 68.8 | 68.8 | 68.8 | 73.5 | 68.8 | 68.8 | 68.8 | 79.0 |
| | (C) | Epoxy curing agent | C-2 | IPD-D230 | 19.5 | 19.5 | 19.5 | 19.5 | 19.5 | 19.5 | 19.5 | 19.5 | 21.0 |
| | (D) | Core shell polymer | D-3P | Powdered Core shell polymer | | | | | 2.0 | | | | |
| | (E) | Dispersion in which (D) is dispersed in (B) | E-2 | (D-2) 30% by weight (B-1) 70% by weight | 6.7 | 6.7 | 6.7 | | | 6.7 | 6.7 | 6.7 | |
| | | | E-3 | (D-3) 30% by weight (B-1) 70% by weight | | | | 6.7 | | | | | |
| | | | (Total amount) | | 100.0 | 100.0 | 100.0 | 100.0 | 100.0 | 100.0 | 100.0 | 100.0 | 100.0 |
| Composition ratio (% by weight) | (A) | End-capped polyalkylene oxide | A-1 | PTA3000 (Allyl group, Ratio of capped ends: 90% or more) | 5.0 | | | | | | | | |
| | | | A-8 | PMB3000 (Butyl group, Ratio of capped ends: 50%) | | 5.0 | | | | | | | |
| | | | A-9 | PMB1870 (Butyl group, Ratio of capped ends: 50%) | | | 5.0 | 5.0 | 5.0 | | | | |
| | | | A-10 | PMB1200 (Butyl group, Ratio of capped ends: 50%) | | | | | | 5.0 | | | |
| | | | A-11 | PPG2000 (Ratio of ) capped ends: 0% | | | | | | | 5.0 | | |
| | | | A-12 | PGEB2000 (Ratio of capped ends: 0%) | | | | | | | | 5.0 | |
| | (B) | Epoxy resin | B-1 | BPADGE | 73.5 | 73.5 | 73.5 | 73.5 | 73.5 | 73.5 | 73.5 | 73.5 | 79.0 |
| | (C) | Epoxy curing agent | C-2 | IPD-D230 | 19.5 | 19.5 | 19.5 | 19.5 | 19.5 | 19.5 | 19.5 | 19.5 | 21.0 |

TABLE 2-continued

|  |  |  |  |  | Example 9 | Example 10 | Example 11 | Example 12 | Example 13 | Comparative Example 10 | Comparative Example 11 | Comparative Example 12 | Comparative Example 13 |
|---|---|---|---|---|---|---|---|---|---|---|---|---|---|
|  | (D) | Core shell polymer | D-2 | Core shell polymer | 2.0 | 2.0 | 2.0 |  |  | 2.0 | 2.0 | 2.0 |  |
|  |  |  | D-3 | Core shell polymer |  |  |  | 2.0 | 2.0 |  |  |  |  |
|  |  | (Total amount) |  |  | 100.0 | 100.0 | 100.0 | 100.0 | 100.0 | 100.0 | 100.0 | 100.0 | 100.0 |
| Component ratio Evaluation | Total amount of (A) and (D) (parts by weight) |  |  |  | 7.0 | 7.0 | 7.0 | 7.0 | 7.0 | 7.0 | 7.0 | 7.0 | 0.0 |
|  | Weight ratio of (A)/(D) |  |  |  | 71/29 | 71/29 | 71/29 | 71/29 | 71/29 | 71/29 | 71/29 | 71/29 | — |
|  | Viscosity at 25° C. of composition (sec) |  |  |  | 29 | 30 | 29 | 29 | 29 | 25 | 29 | 30 | 30 |
|  | Fracture toughness G1c (J/m$^2$) |  |  |  | 1150 | 1000 | 950 | 900 | 840 | 800 | 820 | 510 | 100 |
|  | Glass transition temperature (° C.) |  |  |  | 129 | 129 | 128 | 128 | 126 | 124 | 129 | 117 | 129 |

From the results of Table 2, the toughened epoxy resin composition of one or more embodiments of the present invention had low viscosity without increasing viscosity, and the cured product obtained from the toughened epoxy resin composition of one or more embodiments of the present invention had heat resistance and toughness.

Example 14, Comparative Examples 14 to 15

Each of the components was weighed according to a formulation shown in Table 3, and these components were homogeneously mixed by using stirring equipment (planetary centrifugal mixer, AwatoriRentaro, manufactured by Thinky). The mixture was defoamed under reduced pressure to obtain a toughened epoxy resin composition. The obtained composition was impregnated into a 15 cm×15 cm of a glass clothes (300 g/m$^2$) by using a roller. Twelve sheets were prepared, laminated, and pressed at 100° C. for 1 hour and subsequently at 150° C. for 3 hours to obtain a fiber reinforced composite. Evaluation of the delamination was carried out by using the obtained composite. The results including the viscosity of the toughened epoxy resin composition are shown in Table 3.

From the results of Table 3, the toughened epoxy resin composition of one or more embodiments of the present invention had low viscosity without increasing viscosity, and delamination of the toughened epoxy resin composition of one or more embodiments of the present invention hardly occurred.

Example 15, Comparative Examples 16 to 18

Each of the components except the epoxy curing agent and the defoaming agent was weighed according to a formulation shown in Table 4, and these components were homogeneously mixed by using stirring equipment (planetary centrifugal mixer, AwatoriRentaro, manufactured by Thinky). Thereafter, the epoxy curing agent and the defoaming agent were added and these components were mixed uniformly using the same stirring equipment. The mixture was defoamed under reduced pressure to obtain a toughened epoxy resin composition. The obtained composition was cured at 100° C. for 1 hour, and at 150° C. for 3 hours to prepare a cured product. A glass transition temperature and the thermal shock resistance were evaluated by using the cured product obtained. Results including the viscosity of the toughened epoxy resin composition are shown in Table 4.

TABLE 3

|  |  |  |  |  | Example 14 | Comparative Example 14 | Comparative Example 15 |
|---|---|---|---|---|---|---|---|
| Compounded amount (parts by weight) | (A) | End-capped polyalkylene oxide | A-1 | PTA3000 (Allyl group, Ratio of capped ends: 90% or more) | 6.0 |  |  |
|  | (B) | Epoxy resin | B-1 | BPADGE | 35.3 | 56.0 | 21.3 |
|  | (C) | Epoxy curing agent | C-1 | MTHPA-1% 2E4MZ | 38.7 | 44.0 | 38.7 |
|  | (E) | Dispersion in which (D) is dispersed in (B) | E-1 | (D-1) 30% by weight (B-1) 70% by weight | 20.0 |  | 40.0 |
|  |  | (Total amount) |  |  | 100.0 | 100.0 | 100.0 |
| Composition ratio (% by weight) | (A) | End-capped polyalkylene oxide | A-1 | PTA3000 (Allyl group Ratio of capped ends: 90% or more) | 6.0 |  |  |
|  | (B) | Epoxy resin | B-1 | BPADGE | 49.3 | 56.0 | 49.3 |
|  | (C) | Epoxy curing agent | C-1 | MTHPA-1% 2E4MZ | 38.7 | 44.0 | 38.7 |
|  | (D) | Core shell polymer | D-1 | Core shell polymer | 6.0 |  | 12.0 |
|  |  | (Total amount) |  |  | 100.0 | 100.0 | 100.0 |
| Component ratio Evaluation | Total amount of (A) and (D) (parts by weight) |  |  |  | 12.0 | 0.0 | 12.0 |
|  | Weight ratio of (A)/(D) |  |  |  | 50/50 | — | 0/100 |
|  | Viscosity at 21° C. of composition (sec) |  |  |  | 34 | 34 | 110 |
|  | Content of glass fiber (% by weight) |  |  |  | 70 | 70 | 70 |
|  | Delamination width (mm) |  |  |  | 5 | 12 | 9 |

TABLE 4

|  |  |  |  |  | Example 15 | Comparative Example 16 | Comparative Example 17 | Comparative Example 18 |
|---|---|---|---|---|---|---|---|---|
| Compounded amount (parts by weight) | (A) | End-capped polyalkylene oxide | A-3 | PDA3000 (Allyl group, Ratio of capped ends: 90% or more) | 6.0 |  |  | 8.0 |
|  | (B) | Epoxy resin | B-1 | BPADGE | 18.8 | 28.0 | 4.8 | 23.5 |
|  | (C) | Epoxy curing agent | C-1 | MTHPA-1% 2E4MZ | 18.5 | 22.0 | 18.5 | 18.5 |
|  | (E) | Dispersion in which (D) is dispersed in (B) | E-1 | (D-1) 30% by weight (B-1) 70% by weight | 6.7 |  | 26.7 |  |
|  | (F) | Filler | F-1 | CMC-12S | 50.0 | 50.0 | 50.0 | 50.0 |
|  | (G) | Defoaming agent | G-1 | BYK-1790 | 0.2 | 0.2 | 0.2 | 0.2 |
|  |  | (Total amount) |  |  | 100.2 | 100.2 | 100.2 | 100.2 |
| Composition ratio (% by weight) | (A) | End-capped polyalkylene oxide | A-3 | PTA3000 (Allyl group, Ratio of capped ends: 90% or more) | 6.0 | 0.0 | 0.0 | 8.0 |
|  | (B) | Epoxy resin | B-1 | BPADGE | 23.4 | 27.9 | 23.4 | 23.5 |
|  | (C) | Epoxy curing agent | C-1 | MTHPA-1% 2E4MZ | 18.5 | 22.0 | 18.5 | 18.5 |
|  | (D) | Core shell polymer | D-1 | Core shell polymer | 2.0 | 0.0 | 8.0 | 0.0 |
|  | (F) | Filler | F-1 | CMC-12S | 49.9 | 49.9 | 49.9 | 49.9 |
|  | (G) | Defoaming agent | G-1 | BYK-1790 | 0.2 | 0.2 | 0.2 | 0.2 |
|  |  | (Total amount) |  |  | 100.0 | 100.0 | 100.0 | 100.0 |
| Component ratio |  | Total amount of (A) and (D) (parts by weight) |  |  | 8.0 | 0.0 | 8.0 | 8.0 |
|  |  | Weight ratio of (A)/(D) |  |  | 75/25 | — | 0/100 | 100/0 |
| Evaluation |  | Viscosity of composition (Pa · sec) |  |  | 11 | 10 | 33 | 10 |
|  |  | Glass transition temperature (° C.) |  |  | 150 | 150 | 150 | 150 |
|  |  | Thermal shock resistance (cycle) |  |  | >50 | 10 | 20 | 20 |

From the results of Table 4, the toughened epoxy resin composition of one or more embodiments of the present invention had low viscosity without increasing viscosity, and the cured product obtained from the toughened epoxy resin composition of one or more embodiments of the present invention had excellent balance of physical properties with respect to heat resistance and thermal shock resistance.

Example 16, Comparative Examples 19 to 27

Each of the components was weighed according to a formulation shown in Table 5, and these components were homogeneously mixed by using stirring equipment (planetary centrifugal mixer, AwatoriRentaro, manufactured by Thinky). The mixture was defoamed under reduced pressure to obtain a toughened epoxy resin composition. A tensile shear adhesion test piece was prepared by using the obtained composition, and the shear adhesion strength was evaluated. Results are shown in Table 5.

TABLE 5

| | | | Example 16 | Comparative Example 19 | Comparative Example 20 | Comparative Example 21 | Comparative Example 22 | Comparative Example 23 | Comparative Example 24 | Comparative Example 25 | Comparative Example 26 | Comparative Example 27 |
|---|---|---|---|---|---|---|---|---|---|---|---|---|
| Compounded amount (parts by weight) | (A) End-capped polyalkylene oxide | A-1 PTA3000 (Allyl group, Ratio of capped ends: 90% or more) | 5.0 | | 5.0 | 5.0 | 10.0 | | | | | |
| | | A-7 PPT3000 (Ratio of capped ends: 0%) | | 5.0 | | | | 10.0 | | | | |
| | (B) Epoxy resin | B-1 BPADGE | 47.8 | 47.8 | 52.0 | 59.5 | 59.5 | 59.5 | 36.2 | 44.5 | 59.5 | 66.1 |
| | (C) Epoxy curing agent | C-3 V-140 | 30.5 | 30.5 | 30.5 | 30.5 | 30.5 | 30.5 | 30.5 | 30.5 | 30.5 | 33.9 |
| | (E) Dispersion in which (D) is dispersed in (B) | E-1 (D-1) 30% by weight (B-1) 70% by weight | 16.7 | 16.7 | | | | | 33.3 | | | |
| | (H) Liquid toughner | H-1 CTBN-Adduct (40% CTBN) | | | 12.5 | 5.0 | | | | | | |
| | | H-2 DY965 | | | | | | | | 25.0 | 10.0 | |
| | (I) Thixotropic agent | I-1 TS-720 | 2.5 | 2.5 | 2.5 | 2.5 | 2.5 | 2.5 | 2.5 | 2.5 | 2.5 | 2.5 |
| | (J) Silane Coupling agent | J-1 Z-6040 | 0.5 | 0.5 | 0.5 | 0.5 | 0.5 | 0.5 | 0.5 | 0.5 | 0.5 | 0.5 |
| | (Total amount) | | 103.0 | 103.0 | 103.0 | 103.0 | 103.0 | 103.0 | 103.0 | 103.0 | 103.0 | 103.0 |
| Composition ratio (% by weight) | (A) End-capped polyalkylene oxide | A-1 PTA3000 (Allyl group, Ratio of capped ends: 90% or more) | 4.9 | | 4.9 | 4.9 | 9.7 | | | | | |
| | | A-7 PPT3000 (Ratio of capped ends: 0%) | | 4.9 | | | | 9.7 | | | | |
| | (B) Epoxy resin | B-1 BPADGE | 57.8 | 57.8 | 57.8 | 57.8 | 57.8 | 57.8 | 57.8 | 57.8 | 57.8 | 64.2 |
| | (C) Epoxy curing agent | C-3 V-140 | 29.6 | 29.6 | 29.6 | 29.6 | 29.6 | 29.6 | 29.6 | 29.6 | 29.6 | 32.9 |
| | (D) Core shell polymer | D-1 Core shell polymer | 4.9 | 4.9 | | | | | 9.7 | | | |
| | (H) Liquid toughner | H-1 CTBN | | | 4.9 | 4.9 | | | | | | |
| | | H-2 DY965 | | | | | | | | 9.7 | 9.7 | |
| | (I) Thixotropic agent | I-1 TS-720 | 2.4 | 2.4 | 2.4 | 2.4 | 2.4 | 2.4 | 2.4 | 2.4 | 2.4 | 2.4 |
| | (J) Silane Coupling agent | J-1 Z-6040 | 0.5 | 0.5 | 0.5 | 0.5 | 0.5 | 0.5 | 0.5 | 0.5 | 0.5 | 0.5 |
| | (Total amount) | | 100.0 | 100.0 | 100.0 | 100.0 | 100.0 | 100.0 | 100.0 | 100.0 | 100.0 | 100.0 |
| Component ratio | Total amount of (A), (D), and (H) (parts by weight) | | 10.0 | 10.0 | 10.0 | 10.0 | 10.0 | 10.0 | 10.0 | 10.0 | 10.0 | 0.0 |
| | Weight ratio of (A)/[(D) + (H)] | | 50/50 | 50/50 | 50/50 | 50/50 | 0/100 | 100/0 | 100/0 | 100/0 | 100/0 | — |
| Evaluation | Shear adhesion strength (MPa) | | 18 | 10 | 13 | 10 | 14 | 10 | 14 | 9 | 10 | 10 |

From the results of Table 5, the toughened epoxy resin composition of one or more embodiments of the present invention was also excellent in adhesion.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A toughened epoxy resin composition comprising:
an end-capped polyalkylene oxide (A);
an epoxy resin (B);
an epoxy curing agent (C); and
a core shell polymer (D),
wherein the end-capped polyalkylene oxide (A) has a number average molecular weight of 1500 to 5000,
wherein 40% or more of a total ends of the end-capped polyalkylene oxide (A) are capped with at least one group selected from the group consisting of an alkyl group, an allyl group, and an aryl group,
wherein a weight ratio of the end-capped polyalkylene oxide (A) to the core shell polymer (D) is 10/90 to 90/10,
wherein the core shell polymer (D) comprises a core layer in an amount of 70 to 95% by weight per 100% by weight of the core shell polymer (D),
wherein the core layer is one or more selected from the group consisting of diene rubber, (meth)acrylate rubber, organosiloxane rubber, styrene polymer, and (meth)acrylate polymer, and
wherein the core shell polymer (D) further comprises a shell layer that contains a copolymer comprising 60 to 99% by weight of an alkyl group-containing (meth) acrylate monomer unit, 1 to 40% by weight of an epoxy group-containing vinyl monomer unit, and 0 to 25% by weight of a monomer unit different from the alkyl group-containing (meth) acrylate monomer unit and the epoxy group-containing vinyl monomer unit.

2. The composition according to claim 1, wherein the end-capped polyalkylene oxide (A) is at least one selected from the group consisting of a polypropylene oxide, a polybutylene oxide, and an oxy-3-methyltetramethylene/oxybutylene copolymer.

3. The composition according to claim 2, wherein the capped ends of the end-capped polyalkylene oxide (A) are capped with the allyl group and/or the alkyl group.

4. The composition according to claim 3, wherein an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

5. The composition according to claim 2, wherein 70% or more of the total number of ends of the end-capped polyalkylene oxide (A) are capped.

6. The composition according to claim 2, wherein the core shell polymer (D) further comprises a shell layer that contains a copolymer comprising 60 to 99% by weight of an alkyl group-containing (meth) acrylate monomer unit, 1 to 40% by weight of an epoxy group-containing vinyl monomer unit, and 0 to 25% by weight of a monomer unit different from the alkyl group-containing (meth) acrylate monomer unit and the epoxy group-containing vinyl monomer unit.

7. The composition according to claim 2, wherein an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

8. The composition according to claim 1, wherein the capped ends of the end-capped polyalkylene oxide (A) are capped with the allyl group and/or the alkyl group.

9. The composition according to claim 8, wherein 70% or more of the total number of ends of the end-capped polyalkylene oxide (A) are capped.

10. The composition according to claim 8, wherein the core shell polymer (D) further comprises a shell layer that contains a copolymer comprising 60 to 99% by weight of an alkyl group-containing (meth) acrylate monomer unit, 1 to 40% by weight of an epoxy group-containing vinyl monomer unit, and 0 to 25% by weight of a monomer unit different from the alkyl group-containing (meth) acrylate monomer unit and the epoxy group-containing vinyl monomer unit.

11. The composition according to claim 8, wherein an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

12. The composition according to claim 1, wherein 70% or more of the total number of ends of the end-capped polyalkylene oxide (A) are capped.

13. The composition according to claim 12, wherein the core shell polymer (D) further comprises a shell layer that contains a copolymer comprising 60 to 99% by weight of an alkyl group-containing (meth) acrylate monomer unit, 1 to 40% by weight of an epoxy group-containing vinyl monomer unit, and 0 to 25% by weight of a monomer unit different from the alkyl group-containing (meth) acrylate monomer unit and the epoxy group-containing vinyl monomer unit.

14. The composition according to claim 12, wherein an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

15. The composition according to claim 1, wherein an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

16. A cured product formed from the composition of claim 1.

17. The composition according to claim 1, wherein an amount of the end-capped polyalkylene oxide (A) is 0.5 to 20% by weight per 100% by weight of a sum of the end-capped polyalkylene oxide (A), the epoxy resin (B), the epoxy curing agent (C), and the core shell polymer (D).

18. The composition according to claim 1, wherein the end-capped polyalkylene oxide (A) has the number average molecular weight of 1500 to 3000.

19. A method for preparing the composition of claim 1, comprising mixing a dispersion in which the core shell polymer (D) is dispersed in the epoxy resin (B), the end-capped polyalkylene oxide (A), and the epoxy curing agent (C).

20. A method for preparing the composition of claim 1, comprising mixing a dispersion in which the core shell polymer (D) is dispersed in the end-capped polyalkylene oxide (A), the epoxy resin (B), and the epoxy curing agent (C).

* * * * *